United States Patent [19]

Vachee

[11] 4,367,549
[45] Jan. 4, 1983

[54] METHOD AND APPARATUS FOR MULTIPLEXING A DATA SIGNAL AND SECONDARY SIGNALS

[75] Inventor: Pierre Vachee, LaGaude, France

[73] Assignee: International Business Machines Corp., Armonk, N.Y.

[21] Appl. No.: 233,805

[22] Filed: Feb. 12, 1981

[30] Foreign Application Priority Data

Feb. 27, 1980 [FR] France .................................. 8004748

[51] Int. Cl.$^3$ ............................................... H04J 3/00
[52] U.S. Cl. ..................................................... 370/91
[58] Field of Search ....................... 370/91, 92, 93, 94, 370/41, 42, 43, 44, 105

[56] References Cited

U.S. PATENT DOCUMENTS 3,934,093  1/1976  Thyselius ............................. 370/91
4,035,580  7/1977  Dieter et al. ......................... 370/91

Primary Examiner—Thomas A. Robinson
Attorney, Agent, or Firm—Edward H. Duffield

[57] ABSTRACT

A time-division multiplexing method and device are disclosed for combining a data signal and several secondary binary signals into a train of pulses, whereby data signals can be transmitted at various bit rates in synchronous or asynchronous mode. The data signal and N secondary signals are multiplexed together using two different frames respectively termed "synchronous frame" and "asynchronous frame," depending on whether data transmission is to be performed in synchronous or asynchronous mode. The asynchronous frame comprises a frame-alignment bit having a predetermined value, a data bit, and N bits pertaining respectively to the N secondary signals. The synchronous frame is divided up into n subframes, $l_1$ bits in length each, where n is equal to the integer that is immediately larger than the quantity $N/(l_1-2)$. Length $l_1$ is defined by the relation $l_1 = LR/DR$, where LR is the fixed bit rate for the pulse train resulting from the multiplexing process and DR is the bit rate for the data signal. Each subframe includes a synchronization bit whose value is complementary to that of the frame alignment bit, a data bit, and several bits pertaining respectively to the secondary signals. In addition, the last subframe includes a frame-alignment bit. Each bit within a synchronous or an asynchronous frame is associated with a control bit which has a first predetermined value when it is associated with a synchronization bit or a frame-alignment bit, and the complementary value when it is associated with a data bit or with a bit pertaining to the secondary signals. All of the frame bits together with the associated control bits are then encoded to be simultaneously transmitted over the transmission path. The frame bits define a data channel designated A, and the control bits define another channel designated B. The bits are paired off, with each pair comprising a channel A bit and the channel B bit associated therewith, and each of these pairs is encoded for transmission over the line. The invention also provides the demultiplexing method associated with the multiplexing method. The invention further provides an interface tansmitter and an interface receiver embodying the methods described above and allowing various DTE to exchange data, control and timing signals.

15 Claims, 18 Drawing Figures

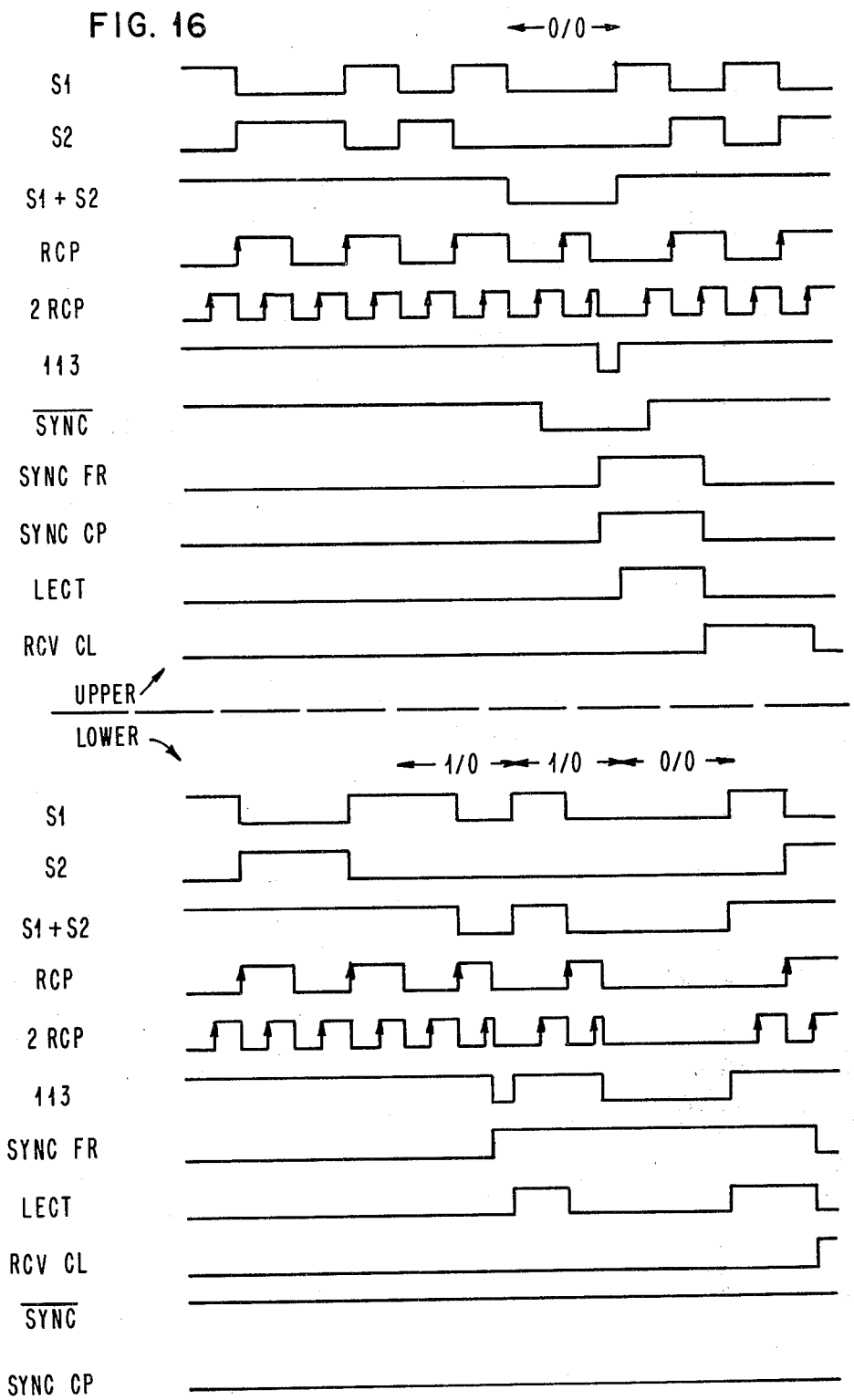

METHOD AND APPARATUS FOR MULTIPLEXING A DATA SIGNAL AND SECONDARY SIGNALS

FIELD OF INVENTION

This invention relates to data transmission systems in general and, more particularly, to a time-division multiplexing method and apparatus for use in such systems. This invention combines a binary data signal with several secondary binary signals supplied by different sources into one train of pulses and transmits these signals in synchronous or asynchronous mode at various bit rates. The invention also relates to the associated demultiplexing method and device. This invention relates to the use of said multiplexing method in an interface transmitter for transmitting, in particular, the state of the binary interchange circuits provided in a CCITT V24 interface over a transmission line, and to the associated interface receiver.

BACKGROUND ART

Time-division multiplexing is a widely used method of transmitting a number of data signals supplied by various sources over one transmission path. Briefly, this method divides the time available into repetitive frames of equal length and each frame is in turn divided into a number of time slots. Each of these is allocated to one data source and is used to transmit either a single bit or a multibit character, depending upon the type of multiplexer involved. In order to detect the positions of the various time slots within a given frame, the multiplexers must be able to determine where the frame begins. Accordingly, the first time slot is used for synchronization purposes. In a character-by-character type of multiplexer, the first time slot always contains a known reference character called a frame-alignment character, which must be received by the remote multiplexer, or demultiplexer, at the beginning of at least two successive frames before transmission of the data can begin. In a bit-by-bit multiplexer, the first time slot is successively used to transmit the different bits of a frame-alignment character and the transmission of data can only begin after the frame-alignment character has been correctly received by the demultiplexer.

The various time-division multiplexing methods and devices that are employed to realize relatively simple multiplexers, such as the IBM 2712 Multiplexer, or more sophisticated ones, like the IBM 3705 Multiplexer, have been extensively described in the literature. However, all of these methods and devices, while suitable for implementing such multiplexers, which are transparent to the signals to be multiplexed (i.e., operate without regard to the nature of the signals involved), do not lend themselves to the realization of simpler devices capable of combining signals of different types, such as data signals and secondary signals, for transmission over a single transmission path.

The need to transmit data signals and secondary signals arises in a teleprocessing network. In such a network, a master data-terminal equipment (DTE) communicates with several slave DTE which lie remote therefrom. The master DTE communicates with each remote DTE through an associated data circuit-terminating equipment (DCE), known as a modem, and through a DCE associated with the remote DTE. The "Comite Consultatif International Telegraphique et Telephonique" (CCITT) has defined in its Recommendation V24 the interface between a DTE and the DCE associated therewith. This interface includes the binary interchange circuits necessary for the transfer of binary data, control and timing signals. To connect a DTE to a DCE, a 16-conductor cable is generally used to transfer sixteen of these binary signals. The cable has a limited length so that specialized modems must be used to connect the master DTE to the associated DCE whenever the distance between the two units exceeds the maximum length of the cable. Also, where the DTE is a multiplexer that is to be connected, for example, to one hundred DCE's, one hundred of said cables are required and the exterior size of the DTE must be such as to enable the physical connections to be made. Large scale integration techniques make it possible to achieve a very substantial reduction in the size of the electronic circuits within the DTE. Thus, the physical exterior is much larger than the necessary interior. It is therefore desirable to provide a means of transmitting the V24 interface signals over a transmission path that does not require the use of sixteen conductors.

French patent application No. 78 29352 filed by the present applicant describes a method of simultaneously encoding first and second sequences of binary signals as one sequence of pulses to be transmitted over a transmission path. The first sequence consists of the data provided by the DTE. The second sequence results from the time-division multiplexing of the control signals supplied by the DTE. In accordance with the method described in the aforesaid patent application, the binary signals are paired off, with each pair being comprised of binary signals belonging to the first sequence and to the second sequence, respectively. Each pair is then encoded as follows: if the binary signal from the first sequence is at a first logic level, the pair is encoded as a bipolar signal; if the signal from the second sequence is at a second logic level, the pair is encoded as a two-phased signal.

The above method, among many others, can be used to provide an interface comprised of a transmitter and a receiver for transmitting signals from the V24 interface over a transmission line; however, its disadvantage is that it does not allow the data signals to be sent at more than one bit rate. Since a given DTE can usually transmit data at several bit rates, one of said interfaces comprised of a transmitter and a receiver would have to be provided for each bit rate together with means for detecting any change in the bit rate and for selecting the appropriate interface accordingly.

OBJECTS OF THE INVENTION

It is an object of this invention to provide an improved time-division multiplexing method and apparatus for combining a data signal and several secondary binary signals into a train of pulses, whereby data signals can be transmitted at various bit rates in synchronous or asynchronous mode.

It is another object of this invention to provide an improved time-division demultiplexing method and apparatus associated with the above-mentioned multiplexing method and apparatus.

It is another object of this invention to provide an improved interface transmitter embodying the above multiplexing method to transmit data, control and timing signals exchanged by two DTE's over one transmission line.

It is another object of this invention to provide an improved interface receiver associated with the above interface transmitter.

SUMMARY OF THE INVENTION

Generally, in the multiplexing method of the present invention, the data signal and N secondary signals are multiplexed together using two different frames. These frames are respectively termed "synchronous frame" and "asynchronous frame," depending on whether data transmission is to be performed in synchronous or asynchronous mode. The asynchronous frame comprises a frame-alignment bit having a predetermined value, a data bit, and N bits pertaining respectively to the N secondary signals. The synchronous frame is divided up into n subframes, $l_1$ bits in length each. In these subframes, n is equal to the integer that is immediately larger than the quantity $N/(l_1-2)$. Length $l_1$ is defined by the relation $l_1 = LR/DR$, where LR is the fixed bit rate for the pulse train resulting from the multiplexing process and DR is the bit rate for the data signal. Each subframe includes a synchronization bit whose value is complementary to that of the frame alignment bit, a data bit, and several bits pertaining respectively to the secondary signals. In addition, the last subframe includes a frame-alignment bit. Each bit within a synchronous or an asynchronous frame is associated with a control bit which has a first predetermined value when it is associated with a synchronization bit or a frame-alignment bit, and the complementary value when it is associated with a data bit or with a bit pertaining to the secondary signals. All of the frame bits together with the associated control bits are then encoded to be simultaneously transmitted over the transmission path.

The invention also provides the demultiplexing method associated with the multiplexing method described above.

The invention further provides an interface transmitter and an interface receiver embodying the methods described above and allowing various DTE's to exchange data, control and timing signals.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 15 and 16 illustrate the waveforms obtained at various points of the generator of FIG. 12 during operation in synchronous and asynchronous modes.

DETAILED SPECIFICATION

Figure 1:
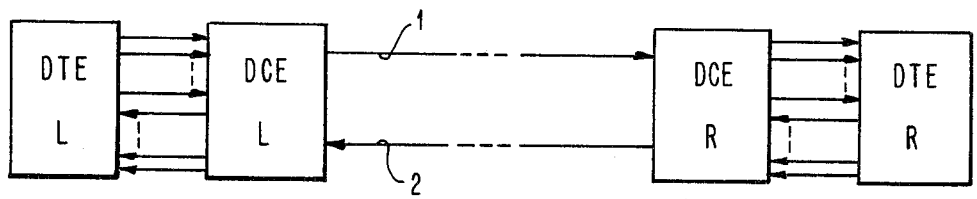
FIG. 1 illustrates a typical data link between two DTE's.

FIG. 1 illustrates a typical data link between two DTE's designated DTE L and DTE R. The DTE's are remote from each other and communicate through a pair of DCE's designated DCE L and DCE R, respectively, via two transmission lines 1 and 2. The DCE L and DCE R are respectively located in the vicinity of the DTE L and DTE R. Each DTE exchanges signals with its associated DCE through an interface of the type defined in CCITT Recimmendation V24. This Recommendation defines the binary interchange circuits necessary for the transfer of binary data, control and timing signals between a DTE and the associated DCE to set up the data circuit, to initialize the DCE, to transmit the data and to release the data circuit. The interchange circuits may be divided into transmitting and receiving groups:

The transmitting circuits, which generate signals transferred from the DTE to the DCE, include, for example, the following circuits:
  "Transmitted Data" (TD), to transfer the data signals originated by the DTE to the DCE,
  "Request to Send" (RTS), to transfer a control signal which causes the DCE to assume the transmit mode,
  "Data Terminal Ready" (DTR), to transfer a control signal indicating that the DTE is ready to operate,
  "Transmitter Timing" (TT-DTE), to transfer timing signals when the DTE controls the transmission of data.

The receiving circuits, which generate signals transferred from the DCE to the DTE, include, for example, the following circuits:
  "Received Data" (RD), to transfer the data signals received by the DCE to the DTE,
  "Ready for Sending" (RFS), to transfer a control signal indicating that the DCE is ready to transmit,
  "Data Set Ready" (DSR), to transfer a control signal indicating that the DCE is ready to operate.
  "Transmitter Timing" (TT-DCE), to transfer timing signals when the DCE controls the transmission of data, and
  "Receiver Timing" (RT), to transfer incoming timing signals to the DTE.

Figure 2:
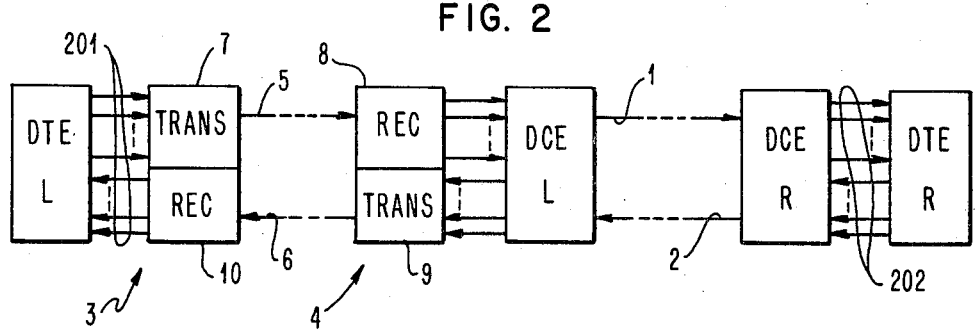
FIG. 2 shows a data link employing an interface transmitter and an interface receiver in accordance with this invention.

FIG. 2 illustrates the context within which the invention finds application. In FIG. 2, a data link employing interface transmitters and receivers in accordance with the invention has been shown by way of example. The data link of FIG. 2 includes the data link components of FIG. 1, the reference numerals of which are unchanged, but differs therefrom in that the DCE L is no longer located near the associated DTE L. The DTE L and the DCE L communicate with each other through a pair of interface repeaters 3 and 4 which are interconnected by a pair of transmission lines 5 and 6. The signals generated by the transmitting circuits in the V24 interface 201 with the DTE L are multiplexed by the transmitter 7 located within the interface repeater 3 for transmission over the line 5. The receiver 8 within the interface repeater 4 demultiplexes the signal received over the line 5 and provides signals which are then fed to the appropriate link circuits in the V24 interface 202 with the DCE L. The signals generated by the receiving circuits in the V24 interface with the DCE L are multiplexed by the transmitter 9 located within the interface repeater 4 for transmission over the line 6. The receiver 10 within the interface repeater 3 demultiplexes the signal received via the line 6 and provides signals which are then applied to the appropriate link circuits in the V24 interface 201 with the DTE L. The interface repeaters 3 and 4 are transparent and the DTE L and R communicate with each other as in the link of FIG. 1.

The multiplexing method of the present invention will now be described. This method enables a number of secondary binary signals and a binary data signal to be multiplexed together to provide a train of pulses transmitted at a fixed bit rate. It should be understood that the data signal can be transmitted at various bit rates either in synchronous mode or in asynchronous mode. It will be assumed by way of example that the method of the present invention is employed in the transmitter of an interface repeater and that the secondary signals are control signals exchanged between a DTE and a DCE. It will further be assumed that the latter transmitter can transmit data signals at the following bit rates, which have been normalized by the CCITT:

Asynchronous transmission mode: 600 and 1,200 bits per second (bps);
Synchronous transmission mode: 600, 1,200, 2,400, 4,800, 9,600, 19,200 bps; and 3,600, 7,200, 14,400 bps.

Figure 3:
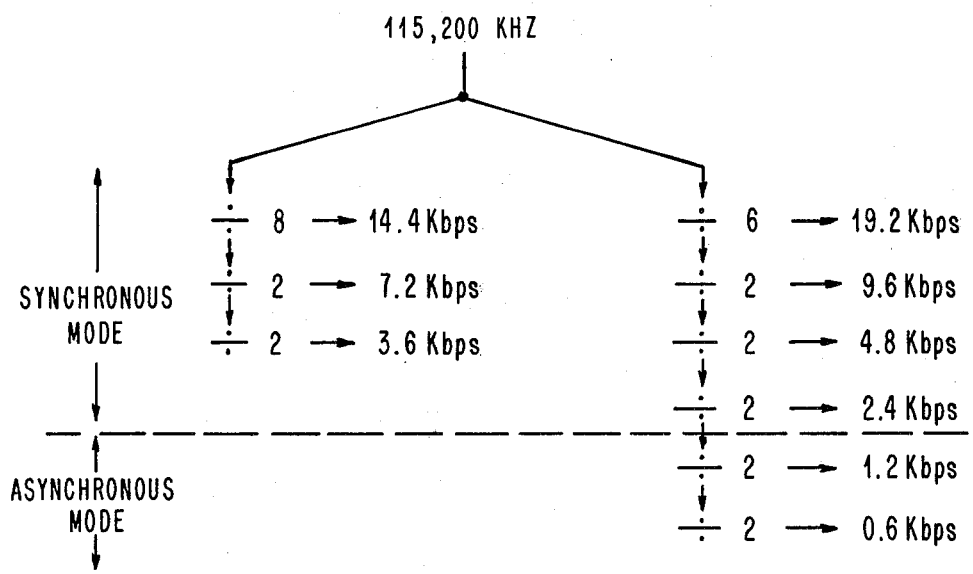
FIG. 3 is a timing tree showing the relationships between the bit rate over the transmission line and the various data signal bit rates.

The fixed bit rate over the transmission line (after multiplexing) should be compatible with all of the allowable bit rates. In this example, to simplify the embodiment of the device which utilizes the invention, a fixed bit rate equal to the least common multiple of even value of 14,400 bps and 19,200 bps, which is 115,200 bps, has been chosen. The acceptable bit rates may be derived from the bit rate over the transmission line by means of successive divisions, as shown in FIG. 3.

In any time-division multiplexing technique, the multiplexed train of bits transmitted at a fixed bit rate is divided up into successive blocks of identical length called frames. Each of these frames is in turn divided up into time slots, each of which is allocated to one of the signals to be multiplexed. These signals are sampled at the frame repetition rate and a sample of each signal is placed in the corresponding time slot. In what follows, since the signals to be multiplexed together are binary signals, the samples will be in the form of bits and the duration of each time slot will be equal to one bit time.

In the method of the present invention, two types of frame, termed "synchronous frame" and "asynchronous frame," are defined. These are used selectively depending on whether the data signal to be multiplexed together with the control signals is to be transmitted in synchronous mode or in asynchronous mode.

The length of the asynchronous frame is defined as follows. If the bit rate over the transmission line is designated as LR bps and if the length (expressed in bits) of the asynchronous frame is designated as $l_0$, in order to transmit all of the bits in the data signal the frame repetition rate, $LR/l_0$ frames per second, must be equal to the highest bit rate at which the transmitter in the interface repeater can transmit the data signal in asynchronous mode. In this example, LR = 115,200 bps and the highest bit rates in asynchronous mode is 1200 bps, so that $$115{,}200/l_0 = 1200 \text{ or}$$
$$l_0 = 96 \text{ bits}$$

A 96-bit long asynchronous frame would permit multiplexing together a data signal transmitted at 1200 bps and 94 control signals, with one of the bits being used as a frame-alignment bit. In practice, 94 control signals would seldom have to be transmitted. Also, in a 96-bit long frame, two successive samples of a given control signal would have to be separated by a time interval equal to the duration of 96 bits. This time interval would cause the transfer of the state of a signal between the DTE and the associated DCE to be delayed.

In a preferred embodiment of the invention, if the number of binary control signals to be multiplexed is designated N, the selected asynchronous frame length will be a sub-multiple of 96 equal to or higher than N+2. In this example, assuming that ten binary control signals are to be multiplexed together, the selected asynchronous frame length would be equal to 12 bits.

Figure 4:
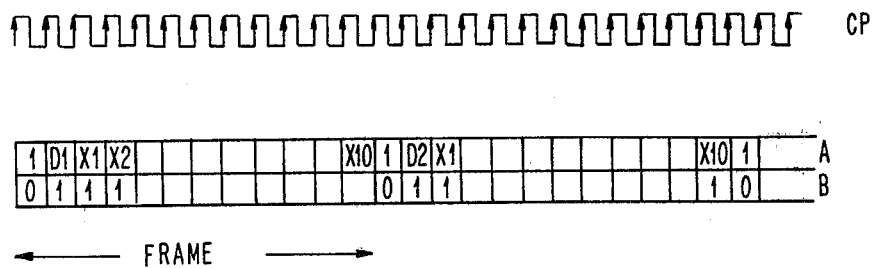
FIG. 4 illustrates an asynchronous frame in accordance with this invention.

A 12-bit long asynchronous frame, that is, a frame comprising 12 time slots, is illustrated in FIG. 4. The structure of the asynchronous frame is as follows. The first time slot is occupied by a frame-alignment bit which has a predetermined value, such as "1". The second time slot contains a data bit, and the next ten slots are respectively occupied by binary samples of the ten control signals, X1–X10, to be multiplexed. It should be noted that the data bits in the successive frames are transmitted at a bit rate of 115,200/12=9600 bps, whereas the normalized asynchronous transmission bit rates, as mentioned earlier, are 1200 and 600 bps. This merely introduces an eight or sixteen-fold redundancy in the transfer of data signals between a DTE and the DCE associated therewith and in no way affects the transmission of data between the DTE L and the DTE R, as briefly described below.

Assume, by way of example, that the DTE L and the DTE R exchange data at a bit rate of 1200 bps and that a "1" bit is present on the Transmitted Data circuit of the DTE L. This "1" bit is present during a time slot having a duration of $1/1200^{th}$ of a second during which it is sampled eight times (9600/1200=8) by the device of the present invention, thereby providing eight "1" bits which will be transferred to the DCE L during the first slot of each of eight successive frames. However, the DCE L, which operates at 1200 bps, will only transmit one of these eight bits to the DCE R.

In conventional time-division multiplexing techniques, each successive frame contains a so-called frame-alignment character. This character is a unique pattern of bits that can readily be detected by the demultiplexer, thereby enabling the device to determine the positions of the various time slots. In the method of the present invention this is accomplished by a single frame-alignment bit to which a predetermined value has been assigned. Obviously, since the other bits in the frame may also assume this predetermined value, the demultiplexer could not distinguish the frame-alignment bit from those other bits if the frame just described were used. To enable the frame-alignment bit to be recognized, control bits respectively associated with the frame bits are generated; the control bit associated with the frame-alignment bit has a first predetermined value, say, "0," and all control bits associated with the data bits and the bits pertaining to the control signals have the complementary value, that is, "1," in this example. The frame bits define a data channel designated A, and the control bits define another channel designated B. The bits are paired off, with each pair comprising a channel A bit and the channel B bit associated therewith, and each of these pairs is encoded for transmission over the line 5 (FIG. 2).

In a preferred embodiment of the invention, each pair is encoded as follows:
If the bit in a given channel has a first predetermined value, for example "0", then the pair will be encoded as a bipolar signal.
If the bit in this given channel has a value complementary to said first value, that is, "1" in this example, then the pair will be encoded as a two-phased signal.

Table I below illustrates by way of example the manner in which the pairs are encoded.

TABLE I

| Channel A | Channel B | Encoding T1 | T2 | |
|---|---|---|---|---|
| 0 | 0 | 0 | 0 | bipolar |
| 1 | 0 | PP | 0 | |
| 0 | 1 | NP | PP | two-phased |
| 1 | 1 | PP | NP | | where
T1 = T2 = T/2
T = duration of a bit time
PP = positive pulse
NP = negative pulse Referring now to FIG. 5, the structure of a synchronous frame in accordance with the invention will be described. The length of this frame is dependent upon the bit rate associated with the data signal to be multiplexed and the number of control signals to be multiplexed. The frame comprises one or more subframes the length of all of which is identical and dependent upon the bit rate at which the data signal is transmitted; also, the last time slot in a frame always includes a frame-alignment bit. The number of subframes depends upon the number of control signals. Each subframe includes a synchronization bit, a data bit and a number of control signal samples. If the bit rate (expressed in bps) associated with the data signal is designated as DR, the length, $l_1$, of a subframe is given by $l_1 = LR/DR$ For example, given a bit rate of 19,200 bps, the length would be:

$$l_1 = \frac{115,200}{19,200} = 6.$$

If the number of control signals to be multiplexed together is designated as N, and knowing that a subframe includes a synchronization bit, a data bit and control signal samples, as seen earlier, then the number n of subframes within a frame will be equal to the integer that is immediately larger than $N/(l_1-2)$ In the above example, if N=10, a frame will comprise three subframes. A frame corresponding to this example is illustrated in FIG. 5. In all subframes, the first time slot contains a synchronization bit, the value of which is complementary to that of the frame-alignment bit, that is, "0" in this example, and the second time slot contains a data bit. The synchronization bits are provided by the timing signals which are generated by the Transmitter Timing circuit and which control the transmission of data.

The first subframe comprises, in succession, a "0" synchronization bit, a data bit, D1, and samples of four control signals, X1–X4. The second subframe comprises, in succession, the "0" synchronization bit, a data bit, D2, and samples of four other control signals, X5–X8. The third and last subframe comprises the "0" synchronization bit, a data bit, D3, samples of the last two control signals, X9–X10, and two "1" bits. The "1" bit contained in the last time slot of the third subframe, that is, in the last slot of the frame, is the frame-alignment bit, and the "1" bit which precedes it is a stuffing bit placed in the penultimate slot, which should have been empty since all samples of the control signals X1–X10 have already been inserted in the frame.

As in the case of the asynchronous frame, control bits are generated and each of these is associated with one of the frame bits. The control bits associated with the frame-alignment bits, the stuffing bits and the synchronization bit are "0" bits. All the control bits associated with the remaining frame bits are "1" bits. The frame bits and the control bits make up data channels A and B, respectively, as in the instance of the asynchronous frame, and the pairs of associated bits are encoded, as has been seen above.

Figure 5:
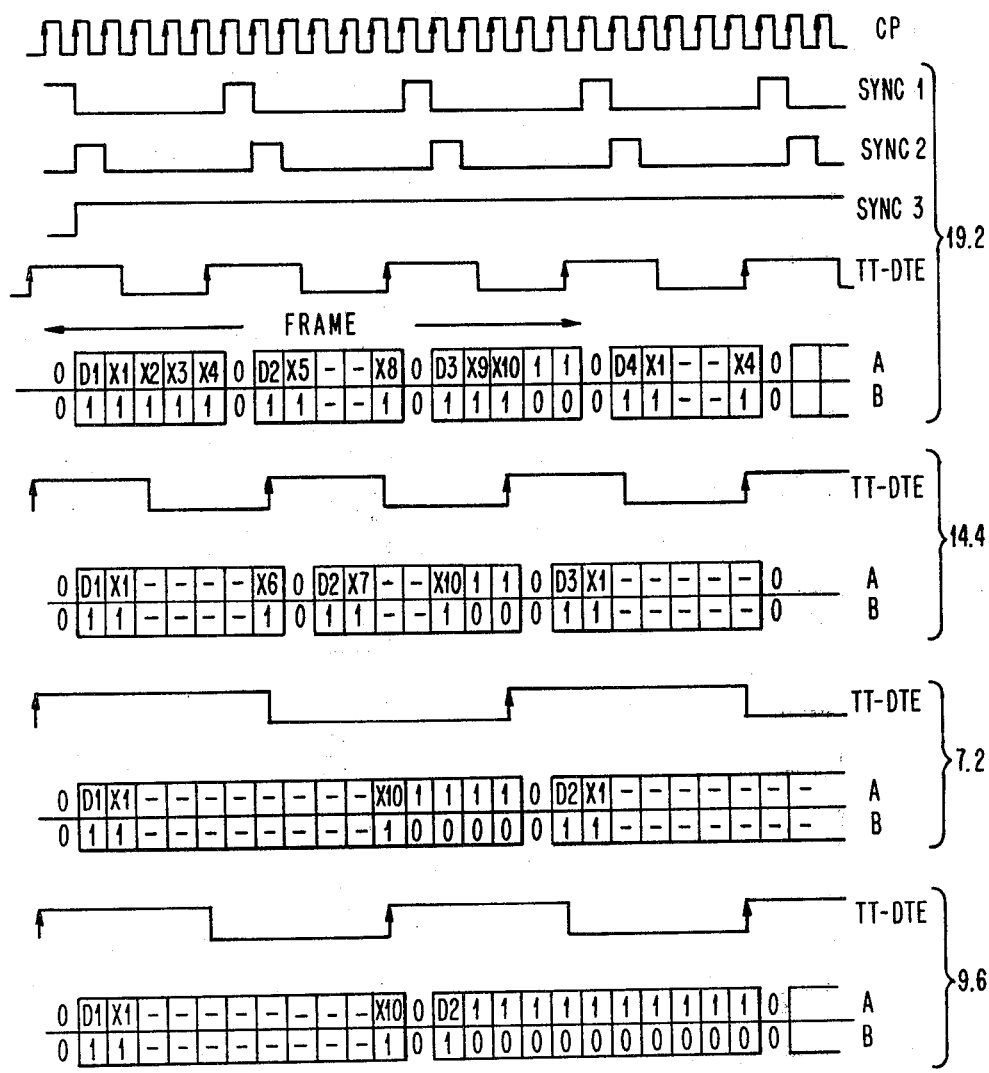
FIG. 5 illustrates exemplary synchronous frames in accordance with this invention for various data signal bit rates.

FIG. 5 also illustrates examples of synchronous frames corresponding to the following bit rates: 14,400 bps, 9600 bps and 7200 bps. Note that, with a bit rate of 14,400 bps, the frame is comprised of two subframes of eight bits each, and that the second subframe includes a stuffing bit. With a bit rate of 9600 bps, the frame is comprised of two subframes of twelve bits each, and the second subframe includes nine stuffing bits. With a bit rate of 7200 bps, the frame consists of a single subframe comprised of sixteen bits, three of which are stuffing bits.

Figure 6:
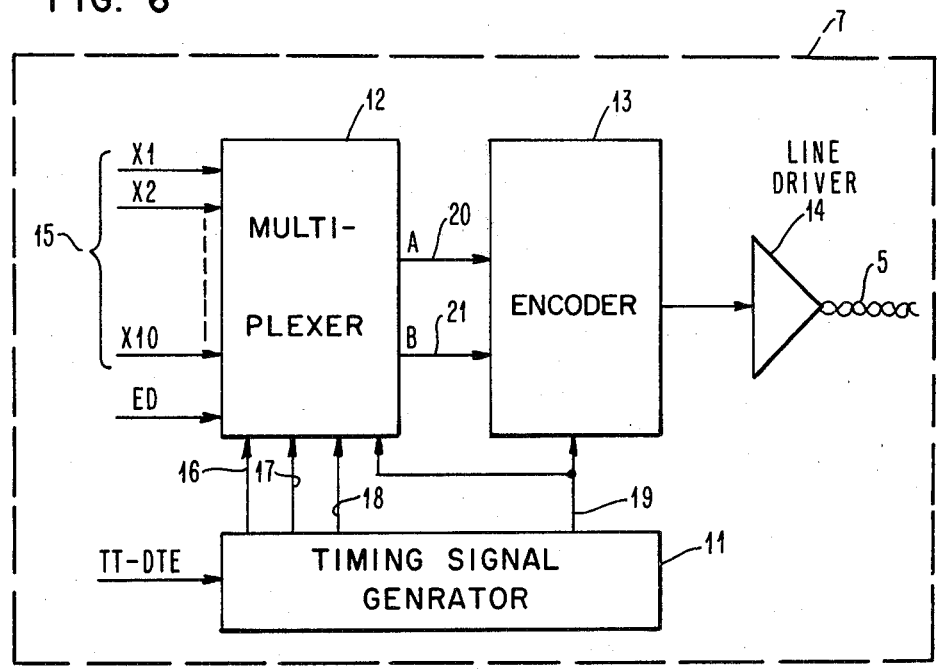
FIG. 6 is a block diagram of an interface transmitter in accordance with the invention.

FIG. 6 is a block diagram of an interface transmitter in accordance with the invention. It has been assumed by way of example that this is the transmitter 7 of FIG. 2 as used in the interface repeater. This transmitter comprises the following four functional units: A timing signal generator 11, a multiplexer 12 and an encoder 13, both of which will be described later with reference to FIGS. 7, 9 and 10, and a balanced line driver or amplifier 14, which is a conventional, commercially available component and will not be described in detail herein.

The multiplexer 12 receives from the DTE L (FIG. 2) control signals supplied by various interchange circuits, and the data to be transmitted as provided by the Transmitted Data circuit. In what follows, it will be assumed that there are ten control signals designated X1–X10. These control signals are supplied in parallel to the multiplexer 12 via ten control lines collectively designated 15. The data to be transmitted is fed to the multiplexer 12 via a line labeled ED. The multiplexer 12 also receives from the generator 11, via four lines 16–19, timing signals to be described later. The multiplexer 12 generates data channels A and B which are applied to the encoder 13 via lines 20 and 21, respectively. The encoder 13 also receives the timing signals present on line 19. The output from the encoder 13 is amplified by the amplifier 14 to be transmitted over line 5 (FIG. 2). In the illustrated example, line 5 is a twisted pair. In the synchronous transmission mode, the generator 11 receives, via a line labeled TT-DTE, the timing signals supplied by the DTE L. In asynchronous mode, no timing signals are received by the generator 11.

Figure 7:
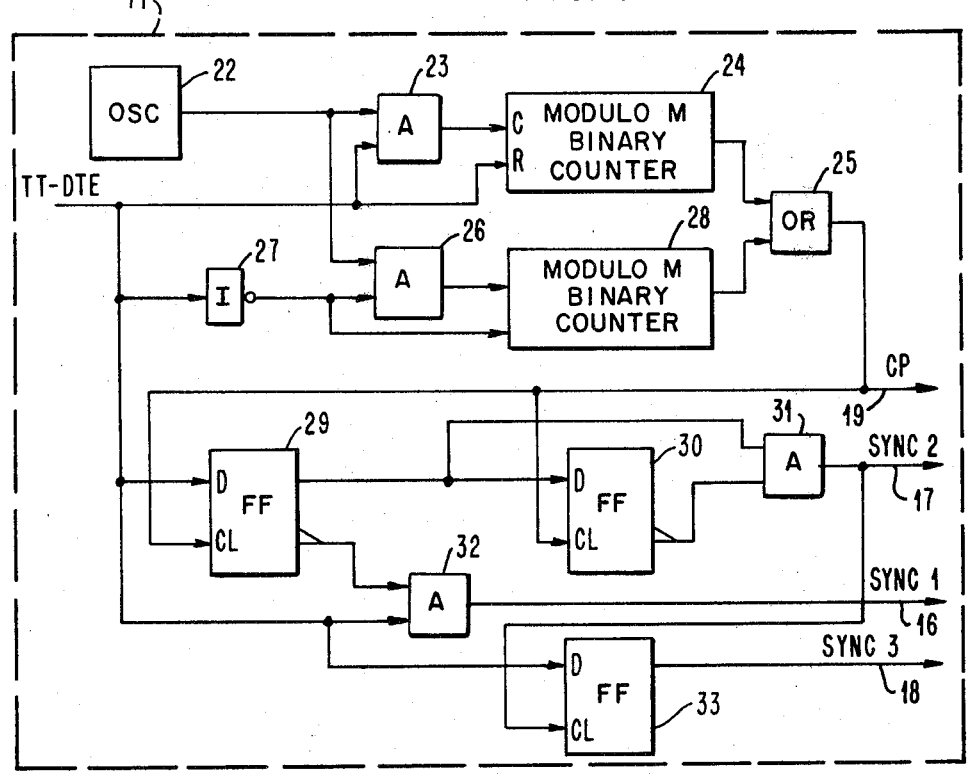
FIG. 7 shows an exemplary embodiment of the timing signal generator 11 of FIG. 6.

FIG. 7 illustrates an exemplary embodiment of the timing signal generator 11. This unit includes a pilot oscillator 22 which generates pulses at a rate equal to M times the bit rate over the transmission line, LR, with M being a positive integer. Assuming that LR=115,200 bps, one could select, for example, M=32, in which case pulses would be generated by the oscillator 22 at a rate of 3.6864 MHz. the output of the oscillator 22 is connected to one input of an AND gate 23, which has its other input connected to the TT-DTE line. The output of the AND gate 23 is connected to the count (C) input of a binary counter 24 which has its reset (R) input connected to the TT-DTE line and its output connected to one of the two inputs of an OR gate 25. The counter 24 is a modulo M counter which produces an output pulse whenever M pulses have been applied to its C input. The counter 24 is reset at the trailing edge of the signal supplied to its R input and remains in that state as long as this signal is low.

The output of the oscillator 22 is also connected to one input of an AND gate 26 which has its other input connected to the output of an inverter 27 whose input is connected to the TT-DTE line. The output of the AND gate 26 is connected to the count (C) input of a binary counter 28 which has its reset (R) input connected to the output of the inverter 27 and its output connected to the other input of the OR gate 25. The counter 28 is identical to the counter 24 and provides an output pulse whenever M pulses have been applied to its C input.

The OR gate 25 produces a signal labeled CP which is supplied to the multiplexer 12 and to the encoder 13 via the line 19 (FIG. 6). The output of the OR gate 25 is supplied to the clock (CL) input of a D-type flip-flop 29 which has its D input connected to the TT-DTE line. The true output of the flip-flop 29 is connected to the D input of another D-type flip-flop 30 and to one of the inputs of a dual input AND gate 31. The flip-flop 30 has its CL input connected to the output of the OR gate 25, and its complement output, identified by means of a triangle in the figure, is connected to the other input of the AND gate 31.

The AND gate 31 produces a signal labeled SYNC 2 which is supplied as an input to the multiplexer via the line 17 (FIG. 6). The complement output of the flip-flop 29 is connected to an input of an AND gate 32 which has its other input connected to the TT-DTE line. The AND gate 32 produces a signal labeled SYNC 1 which is supplied as an input to the multiplexer 12 via the line 16 (FIG. 6). The output of the AND gate 31 is connected to the clock (CL) input of a D-type flip-flop 33 whose D input is connected to the TT-DTE line.

The true output of the flip-flop 33 produces a signal labeled SYNC 3 which is supplied as an input to the multiplexer 12 via the line 18 (FIG. 6). It will be recalled that, in a D-type flip-flop, the true output assumes the state of the signal applied to the D input at the rising edge of the signal applied to the clock (CL) input. Accordingly, any change in the state of the signal applied to the D input that occurs while the signal applied to the CL input is high or low has no effect on the state of the true output.

A brief description of the operation of the device of FIG. 7 will now be given with reference to FIG. 8, which illustrates the waveforms obtained at various points of the timing signal generator.

In asynchronous mode, no signal is present on the TT-DTE line which is held at a low level. Thus, the output of the AND gate 23 remains at a low level and the counter 24 produces no pulses. The output of the inverter 27 is at a high level and the pulses generated by the oscillator 22 are applied to the C input of the counter 28 through the AND gate 26. The counter 28 produces the CP signal. The SYNC 1, SYNC 2 and SYNC 3 signals are held at a low level.

Figure 8:
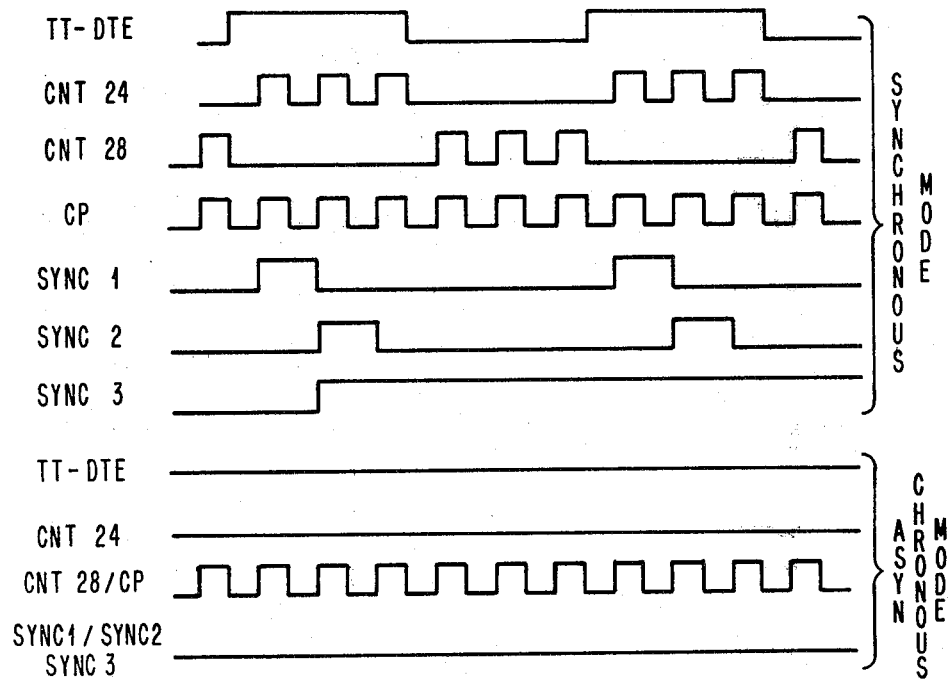
FIG. 8 shows the waveforms obtained at various points of the generator of FIG. 7.

In synchronous mode, the DTE L sends pulses over the TT-DTE line at a rate corresponding to the bit rate, as shown in FIG. 8. Whenever the signal on the TT-DTE line is high, the pulses generated by the oscillator 22 are supplied to the counter 24, which provides the CP signal. The application of said pulses to the counter 28 is inhibited by a low signal supplied by the inverter 27 to the AND gate 26. Whenever the signal on the TT-DTE line is low, the pulses generated by the oscillator 22 are fed through the AND gate 26 to the counter 28, which supplies the CP signal, while their application to the counter 24 is inhibited. The SYNC 1, SYNC 2 and SYNC 3 waveforms are illustrated in FIG. 8.

Figure 9:
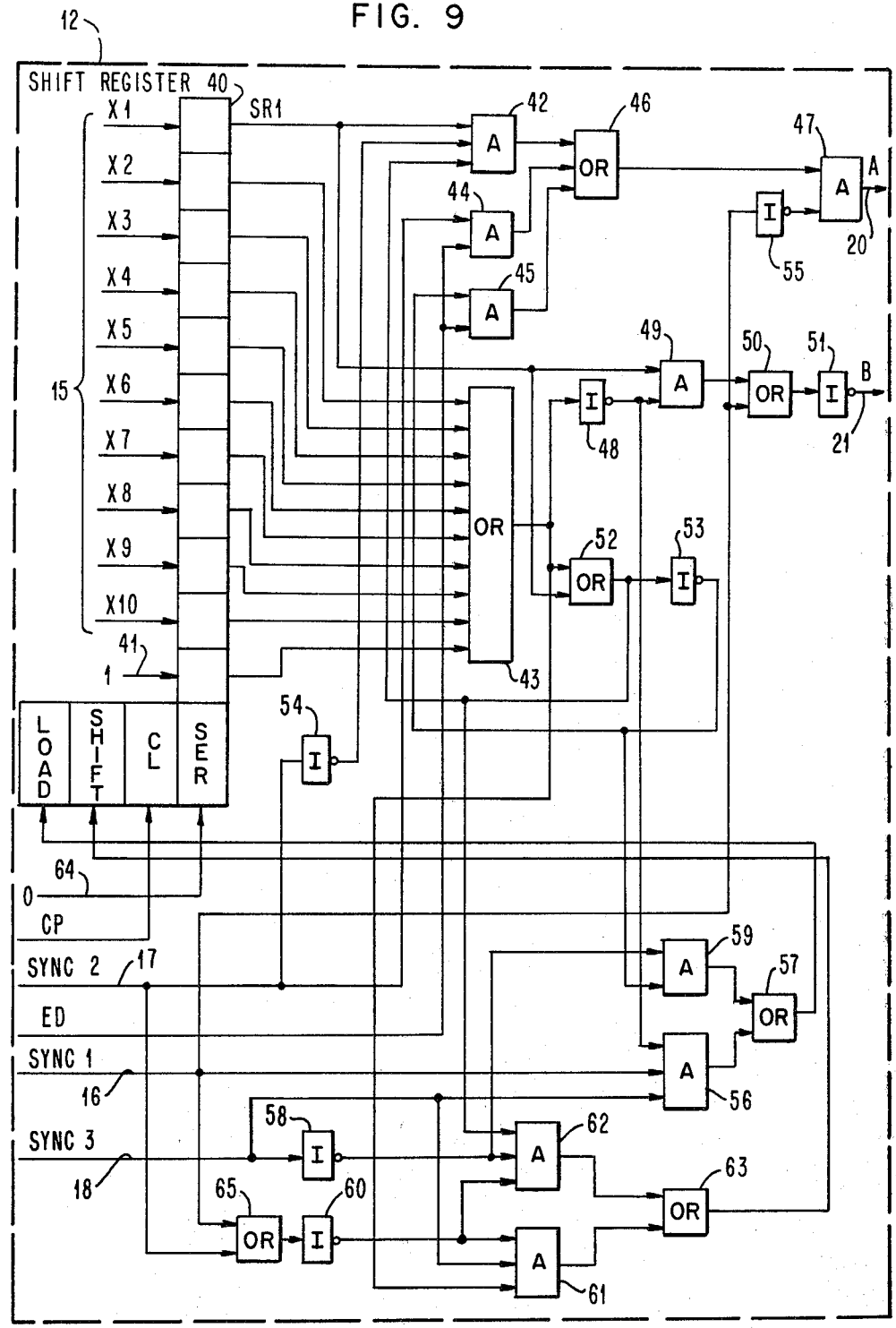
FIG. 9 shows an exemplary embodiment of the multiplexer 12 of FIG. 6.

Referring now to FIG. 9, there is shown an exemplary embodiment of the multiplexer 12 of FIG. 6. The multiplexer 12 includes a commercially available shift register 40 comprising eleven stages that can be loaded serially or in parallel. Each of these can store one bit. As shown, the input of the lowermost stage is connected to a line 41 and the inputs of the remaining ten stages are respectively connected to the ten control lines 15 (FIG. 6). The uppermost stage has its output, labeled SR1, connected to one of the three inputs of an AND gate 42. The remaining ten stages have their outputs respectively connected to the inputs of an OR gate 43. The ED line (FIG. 6) is connected to one input of an AND gate 44, the other input of which is connected to the line 17. The ED line is further connected to one input of an AND gate 45. The outputs of gates 42, 44 and 45 are connected to the inputs of an OR gate 46 which has its output connected to the inputs of an OR gate 46 which has its output connected to one of the two inputs of an AND gate 47 whose output is connected to the line 20 (FIG. 6). The output of the OR gate 43 is connected through an inverter 48 to one input of an AND gate 46 which has its other input connected to the SR1 output. The output of the AND gate 49 is connected to one input of an OR gate 50 which has its other input connected to the line 16 and its output connected to the line 21 (FIG. 6) through an inverter 51. The output of the OR gate 43 is also connected to one input of an OR gate 52 which has its other input connected to the SR1 output. The output of the OR gate 52 is connected to one input of the AND gate 42 and to the input of an inverter 53 whose output is connected to the other input of the AND gate 45. The line 17 is also connected to one input of the AND gate 42 through an inverter 54. The line 16 is also connected to the other input of the AND gate 47 through an inverter 55, and to one input of an AND gate 56 which has its other two inputs respectively connected to the line 18 (FIG. 6) and to the output of the inverter 48.

The output of the AND gate 56 is connected to one of the two inputs of an OR gate 57 which has its output connected to the Load input of the shift register 40. The line 18 is further connected through an inverter 58 to one input of an AND gate 59 which has its other input connected to the output of the inverter 53 and its output connected to the other input of the OR gate 57.

The lines 16 and 17 are connected to the inputs of an OR gate 65 which has its output connected through an inverter 60 to one input of an AND gate 61 whose other two inputs are respectively connected to the line 18 and to the output of the OR gate 43. The output of the inverter 60 is also connected to one input of an AND gate 62 which has its other two inputs connected to the output of the inverter 58 and to that of the OR gate 52. The outputs of the AND gates 61 and 62 are connected to the inputs of an OR gate 63 which has its output connected to the Shift input of the shift register 40.

The inputs of the shift register 40 labeled Clock (CL) and Serial Input (SER) are respectively connected to the line 19 (FIG. 6) and to a line 64.

The content of the shift register 40 is shifted one stage upward at the rising edge of the signal applied to its Clock input if a high level is present at its Shift input. When the content of the register is shifted, the signal present at its SER input is loaded into its lowermost stage. The signals on the lines 15 and 41 are loaded into the shift register at the rising edge of the signal applied to its Clock input, if a high level is present at its Load input.

The operation in asynchronous mode of the multiplexer shown in FIG. 9 will now be described with reference to that Figure and also to FIG. 4. In what follows, it will be assumed that a "1" bit corresponds to a high level, and a "0" bit, to a low level. As mentioned earlier, the SYNC 1, SYNC 2 and SYNC 3 signals are held at a low level which causes the outputs of the AND gates 42, 44, 56 and 61 to remain at a low level.

It will be assumed that, initially, the uppermost stage of the shift register 40 contains a "1" bit and that all other stages contain a "0" bit. The output of the OR gate 43 is at a low level, the output of the OR gate 52 is at a high level, and the "1" bit available on the SR1 output of the shift register 40 is supplied as a frame-alignment bit to the channel A output line 20 through the gates 42, 46 and 47. The output of the AND gate 49 is at a high level and the inverter 51 produces a "0" bit which is applied on the channel B output line 21. The high level at the output of the OR gate 52 is applied to the Shift input of the register 40 through the gates 62 and 63. At the first rising edge of the CP signal, the content of the shift register 40 is shifted upward, following which the register will only contain "0" bits.

The output of the inverter 53 is at a high level and the data bit D1 present on the ED line is applied on the channel A output line 20 through the gates 45, 46 and 47. The SR1 output of the shift register 40 holds the output of the AND gate 49 at a low level and the inverter 51 produces a "1" bit on the channel B output line 21. The high output of the inverter 53 is applied to the Load input of the shift register 40 through the gates 59 and 57. At the second rising edge of the CP signal, the samples of the control signals X1–X10 available on the lines 15, as shown, and a "1" bit sent over the line 41, are loaded into the shift register 40. The outputs of the OR gates 43 and 52 go high, the output of the AND gate 45 goes low and the sample of the signal X1 available on the SR1 output is sent over the output line 20 through the gates 42, 46 and 47. The high output of the OR gate 43 is inverted by the inverter 48 and holds the output of the AND gate 49 at a low level, and the inverter 51 produces a "1" bit that is applied on the output line 21. The low output of the inverter 53 holds the Load input of the shift register 40 at a low level so that no bits may be loaded in parallel into the register. The high output of the OR gate 52 is fed to the Shift input of the register 40 through the gates 62 and 63. At the third rising edge of the CP signal, the content of the register 40 is shifted one stage upward and a "0" bit applied to the SER input via the line 64 is loaded into the lowermost stage of the register 40. The sample of the signal X2 then becomes available on the SR1 output and is sent over the output line 20 through the gates 42, 46 and 47, and a "1" bit is sent over the output line 21, as has been seen.

The shifting process within the register 40 continues in a similar manner until the sample of the signal X10 has been sent over the output line 20, that is, until the "1" bit initially loaded into the lowermost stage of the register 40 has been transferred to the uppermost stage, each of the other stages containing a "0" bit. The "1" bit available at the SR1 output is sent over the line 20 as a frame-alignment bit through the gates 42, 46 and 47. The outputs of the OR gate 43 and the AND gate 49 are both low, and the inverter 51 produces a "0" bit which is sent over the output line 21. At the next rising edge of the CP signal, the content of the shift register 40 is shifted upward, as a result of which the register will only contain "0" bits, and so forth.

The operation in synchronous mode of the multiplexer of FIG. 9 will now be described with reference to that Figure and to FIG. 5. It will be assumed, by way of example, that the data rate is 19.2 kbps, that the SYNC 1, SYNC 2 and SYNC 3 signals initially are at a low level, and that all stages of the shift register 40 contain a "0" bit. The output of the inverter 53 is high and the Load input of the register 40 is also high. At the first rising edge of the CP signal, the samples of the signals X1–X10 on the lines 15 and the "1" bit on the line 41 are loaded into the register 40, and the SYNC 1 signal on the line 16 goes high. This high level is inverted by the inverter 55 and the AND gate 47 produces a "0" bit which is sent as a frame-alignment bit over the output line 20. The same high level is also inverted by the inverter 51, which produces a "0" bit that is sent over the line 21. The output of the inverter 53 goes low and causes the Load input to go low through the gates 59 and 57. The high level on the line 16 is inverted by the inverter 60 and holds the outputs of the gate 61, 62 and 63 and the Shift input of the register 40 at a low level. At the second rising edge of the CP signal, the SYNC 1 signal on the line 16 goes low and the SYNC 2 and SYNC 3 signals on the lines 17 and 18 go high. The high level on the line 17 is inverted by the inverter 54 and causes the output of the AND gate 42 to remain low, and the first data bit, D1, on the ED line is sent over the output line 20 through the gates 44, 46 and 47. The output of the OR gate 43 is at a high level which is inverted by the inverter 48, and the inverter 51 produces a "1" bit which is sent over the output line 21. The high level on the line 17 is inverted by the inverter 60 and holds the outputs of the gates 61, 62 and 63 as well as the Shift input of the register 40 at a low level.

At the third rising edge of the CP signal, the SYNC 2 signal on the line 17 goes low. The high output of the OR gate 52 and the low level on the line 17 enable the sample of the signal X1, which is available at the SR1 output, to be transmitted over the output line 20 through the gates 42, 46 and 47. The output of the OR gate 43 is at a high level which is inverted by the inverter 48, and the inverter 51 produces a "1" bit which is sent over the output line 21. Since the output of the OR gate 43 and SYNC 3 signal are both at a high level and since the SYNC 1 and SYNC 2 signals are both at a low level, the AND gate 61 produces a high level which is applied to the Shift input of the register 40 through the OR gate 63. At the fourth rising edge of the CP signal, the content of the register 40 is shifted upward and a "0" bit is loaded into its lowermost stage, The sample of the signal X2 now available at the SR1 output is transmitted over the line 20 and a "1" bit is transmitted over the line 21. The Shift input of the register 40 is held at a high level. The samples of the signals X3 and X4 are successively sent over the output line 20 in a similar fashion.

At the seventh rising edge of the CP signal, the content of the shift register is shifted upward and the SYNC 1 signal goes to a high level which is inverted by the inverters 55 and 51 and causes a "0" bit to be sent over the input lines 20 and 21. The high SYNC 1 signal also causes a low level to be supplied to the Shift input of the register 40. At the eighth rising edge of the CP signal, the SYNC 1 signal goes low and the SYNC 2 signal goes high and the data bit D2 available on the ED line is sent over the output line 20 while a "1" bit is sent over the output line 21. The Shift input of the register 40 is held at a low level. At the ninth rising edge of the CP signal, the SYNC 2 signal goes low and the sample of the signal X5 available at the SR1 output is sent over the output line 20 while a "1" bit is sent over the line 21. A high level is applied to the Shift input of the register 40. The samples of the signals X6–X10 are sent over the line 20 in the order shown in the figure and in the manner described above.

At the seventeenth rising edge of the CP signal, the "1" bit initially loaded into the lowermost stage of the shift register 40 is in its uppermost stage, all other stages of the register contain a "0" bit, the SYNC 1 and SYNC 2 signals are both low and the SYNC 3 signal is high. This "1" bit is available at the SR1 output and is sent over the output line 20. The outputs of the gates 43 and 49 are low and high, respectively, and the inverter 51 produces a "0" bit which is sent over the output line 21. A low level is applied to the Shift input of the shift register 40. At the eighteenth rising edge of the CP signal, a "1" bit and a "0" bit are again sent over the output lines 20 and 21, respectively. At the nineteenth rising edge of the CP signal, the SYNC 1 signal goes high and causes a "0" bit to be sent over the lines 20 and 21. Since the SYNC 1 and SYNC 2 signals and the output of the inverter 48 are all at a high level, the AND gate 56 provides a high level which is applied to the Load input of the shift register 40 through the OR gate 57. At the twentieth rising edge of the CP signal, the new samples of the signals XI–X10 and the "1" bit present on the line 41 are loaded into the register 40 and the next frame is formed in the manner previously described.

Figure 10:
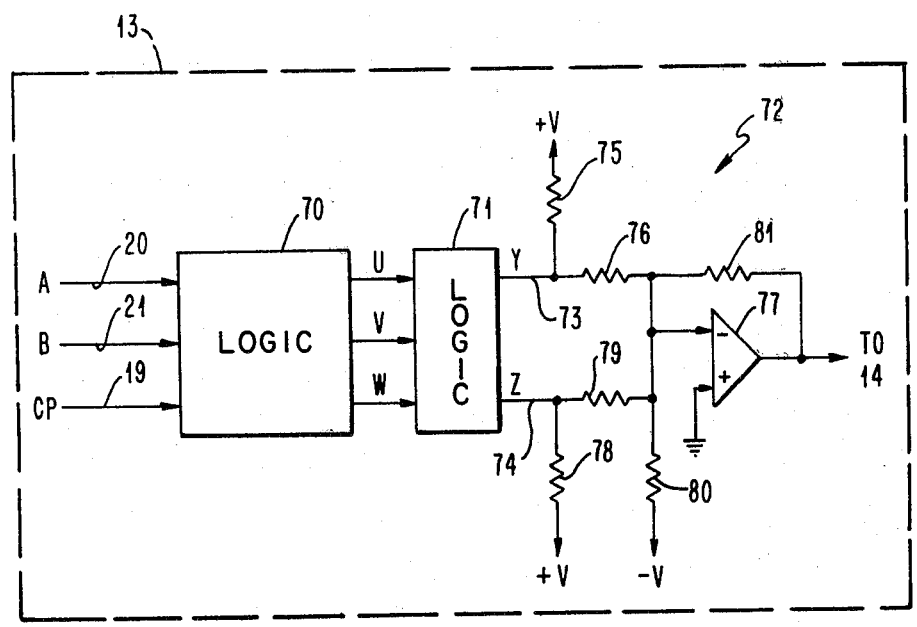
FIG. 10 illustrates an exemplary embodiment of the encoder 13 of FIG. 6.

Referring now to FIG. 10, an exemplary embodiment of the encoder 13 of FIG. 6 is shown. This embodiment includes two logic circuits 70 and 71 and an analog encoder network 72. The logic circuit 70 receives as inputs the channel A binary signals, designated A signals hereafter, the channel B binary signals, designated B signals hereafter, and the CP timing signals, which are respectively supplied thereto via the lines 20, 21 and 19. The logic circuit 70 derives from the A, B and CP signals the U, V and W signals in accordance with the following logic relations:

$$U = A\ CP + \bar{A}\ B\ \overline{CP} \quad (1)$$

$$V = \bar{A}\ B\ CP + A\ B\ \overline{CP} \quad (2)$$

$$W = \bar{A}\ \bar{B} + A\ \bar{B}\cdot \overline{CP} \quad (3)$$

The logic circuit 70 is conventionally comprised of a set of logic gates. Relations (1) to (3) are directly derived from the previously described Table I, which is a truth table for the logic circuit 70. It will be noted that:

The CP signal and its inverse, $\overline{CP}$, have a logical "1" value during the first half, T1, and the second half, T2, of the time slot corresponding to a bit time, respectively.

The U, V and W signals are representative of the encoded signal and correspond respectively, when they have a logical "1" value, to a positive pulse (PP), to a negative pulse (NP), and to a no-pulse condition (0).

The U, V, W signals are applied to the logical circuit 71 which derives therefrom the Y and Z logic signals in accordance with the following logic relations:

$$Y = U\overline{VW} + W \quad (4)$$

$$Z = U\overline{VW} \quad (5)$$

The logic circuit 71 is conventionally comprised of a set of logic gates.

The Y and Z logic signals are applied to the inputs 73 and 74 of the analog encoder 72. The input 73 is connected to one end of a resistor 75 which has its other end connected to a DC voltage source supplying a voltage +V. The input 73 is also connected to one end of a resistor 76 which has its other end connected to the inverting input of an operational amplifier 77. The input 74 is connected to one end of a resistor 78, the other end of which receives the voltage +V. The input 74 is also connected to one end of a resistor 79 which has its other end connected to the inverting input of the amplifier 77. This input is also connected to one end of a resistor 80, the other end of which receives a voltage −V. The output of the amplifier 77 is connected to its inverting input through a resistor 81. The non-inverting input of the amplifier 77 is grounded. All resistors have the same value, R. The analog encoder 72 provides a positive pulse, (PP), a negative pulse, (NP), or no pulse (0), in accordance with Table II below:

TABLE II

| Y | Z | OUTPUT |
|---|---|--------|
| 1 | 1 | (PP) |

TABLE II-continued

| Y | Z | OUTPUT |
|---|---|--------|
| 1 | 0 | 0 |
| 0 | 1 | 0 |
| 0 | 0 | (NP) |

The output from the amplifier 77 is supplied to the line amplifier 14.

For clarity, the encoder 13 illustrated in FIG. 10 has been provided with two separate logic circuits 70 and 71. In actual practice, however, these two logic circuits would be combined into a single circuit.

Figure 11:
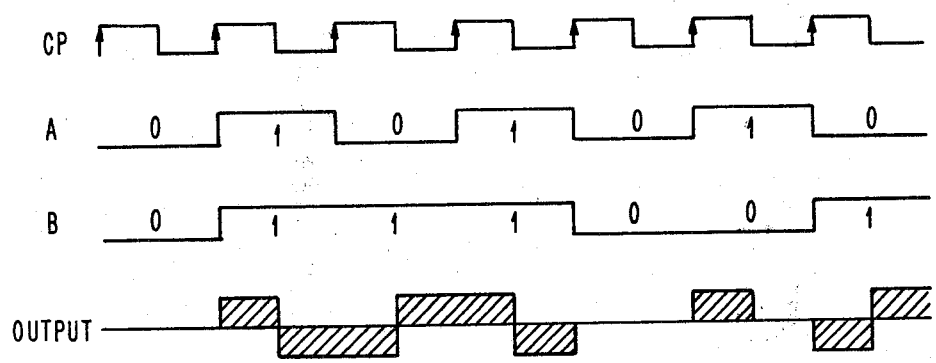
FIG. 11 shows the waveforms obtained at various points of the encoder of FIG. 10.

FIG. 11 shows the waveforms obtained at various points of the encoder 13 of FIG. 10.

Figure 12:
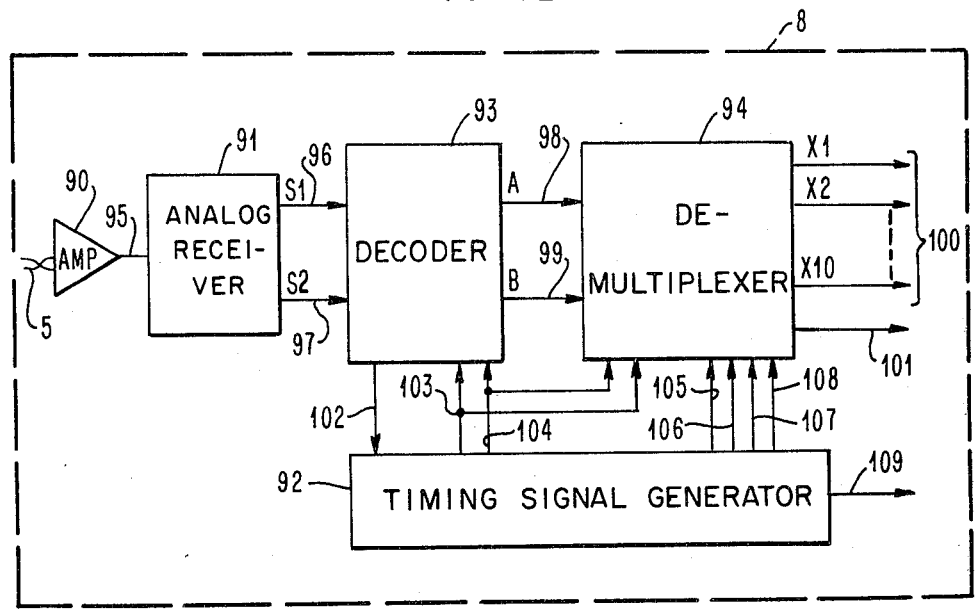
FIG. 12 is a block diagram of an interface receiver in accordance with the invention.

Referring now to FIG. 12, a block diagram of an interface receiver in accordance with the invention is shown. It will be assumed by way of example that the illustrated receiver is the receiver 8 of FIG. 2. This receiver includes the following functional units. A balanced line driver amplifier 90, which is a conventional, commercially available component and will not be described in detail hereafter. An analog receiver 91. A timing signal generator 92. A decoder 93 and a demultiplexer 94 to be described later with reference to FIGS. 13, 14, 17 and 18. The signal received over the line 5 is amplified by the driver 90 and supplied via a line 95 to the analog receiver 91, which derives therefrom two signals designated S1 and S2 to be defined later. The signals S1 and S2 are applied via the lines 96 and 97 to the decoder 93, which produces the channel A and B signals. These are respectively supplied via lines 98 and 99 to the demultiplexer 94 which derives therefrom the samples of the control signals X1-X10 and the received data which are respectively applied to the DCE L (FIG. 2) via ten lines collectively labeled 100 and a line 101. The timing signal generator 92 receives from the decoder 93 a (S1+S2) signal via a line 102 and supplies various timing signals to be defined later to the decoder 93, the demultiplexer 94 and the DCE L via the lines 102-109.

Figure 13:
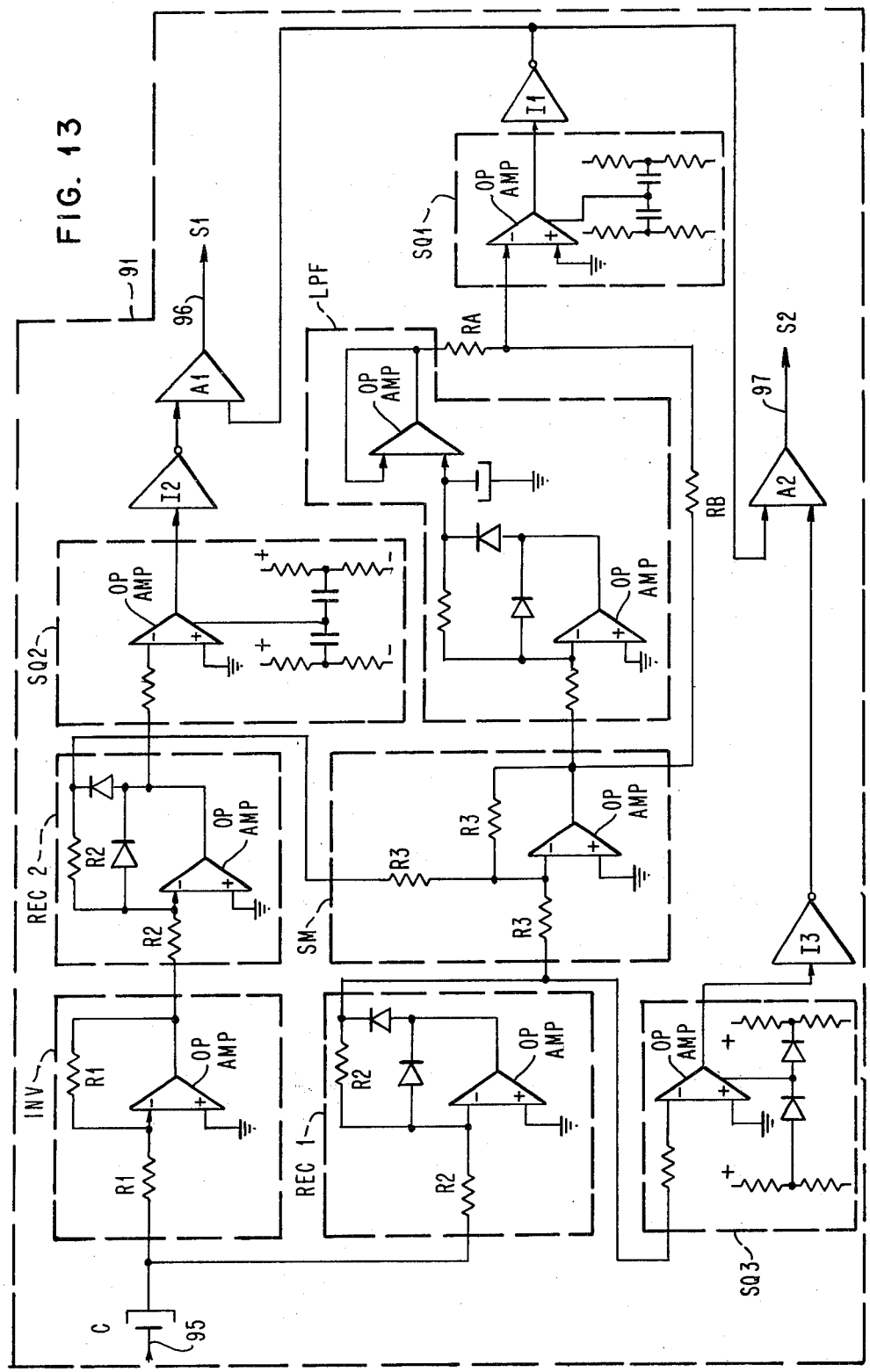
FIG. 13 shows an exemplary embodiment of the analog receiver 91 of FIG. 12.

Referring now to FIG. 13, an exemplary embodiment of the analog receiver 91 is shown. The signal received over the line 5 and amplified by the driver 90 is supplied via the line 95 to a half-wave rectifier REC 1 and to an inverter INV through a decoupling capacitor C. The output of the inverter INV is supplied to a half-wave rectifier REC 2. A circuit labeled SM adds up the outputs of the rectifiers REC 1 and REC 2 and provides a fully rectified signal which is applied to a low-pass filter LPF whose output defines a DC reference level that is applied to a squarer SQ1 through a resistor RA. Similarly, the output of the SM Circuit is supplied to the squarer SW1 through a resistor RB. The value of the ratio RA/RB defines the discrimination level, or threshold, of the analog receiver. The output of the squarer SQ1 is inverted by the logic inverter I1 which has its output connected to one input of each of two AND gates A1 and A2. The other input of the AND gate A1 is connected through a logic inverter I2 to the output of a squarer SQ2, and the other input of the AND gate A2 is connected through a logic inverter I3 to the output of a squarer SQ3. The inputs of the squarers SQ2 and SQ3 are respectively connected to the outputs of the rectifiers REC1 and REC 2. The AND gate A1 provides on the line 96 a binary signal S1 which is at a high level when the signal received over the line 5 is at a high level, and the AND gate A2 provides on the line 97 a binary signal S2 which is at a high level when the signal received over the line 5 is at a low level. Thus, the analog receiver 91 indicates the level of the received signal relative to the discrimination threshold.

Figure 14:
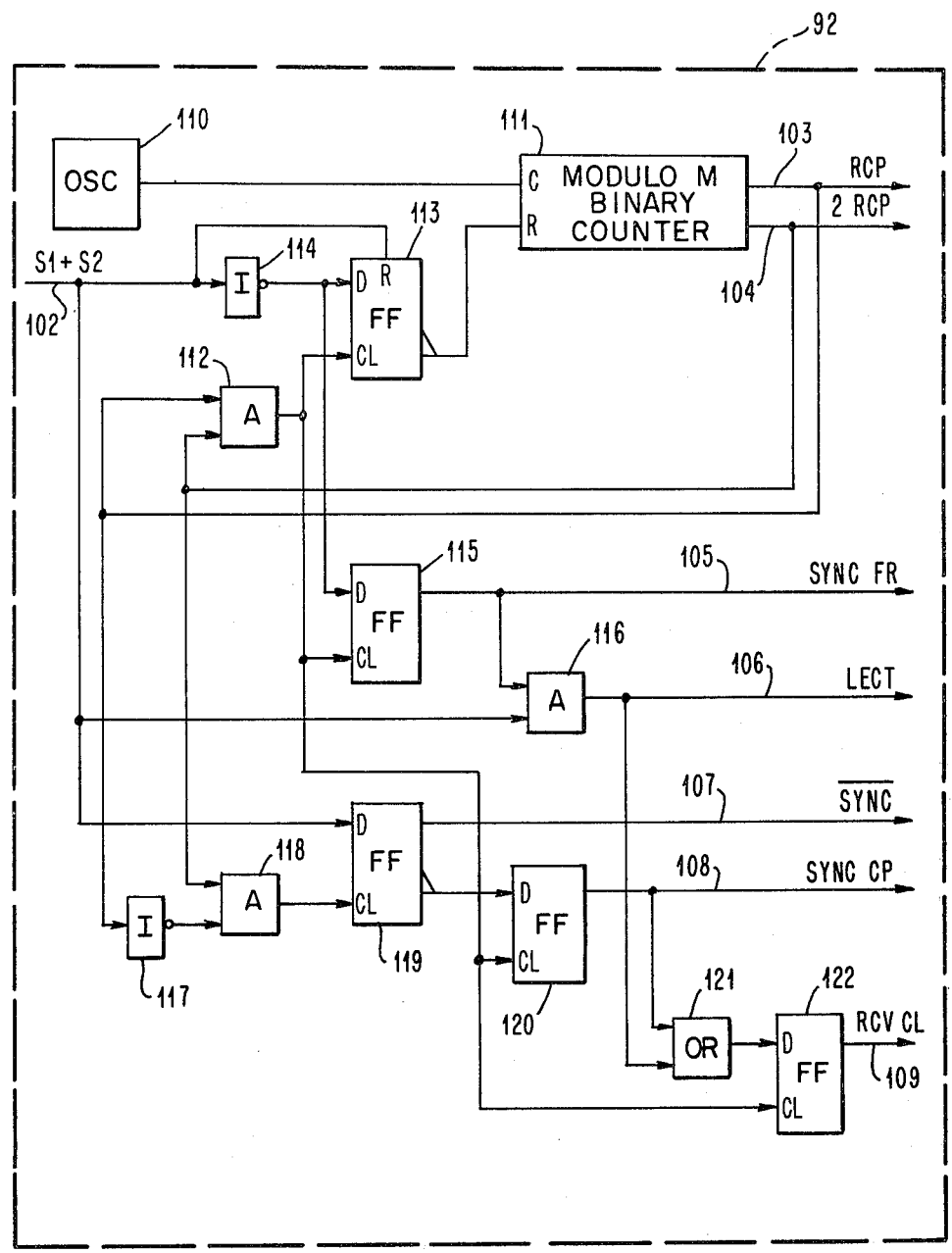
FIG. 14 is an exemplary embodiment of the timing signal generator 92 of FIG. 12.

Referring now to FIG. 14, an exemplary embodiment of the timing signal generator 92 is shown. This generator includes a pilot oscillator 110 which generates pulses at a rate equal to M times the bit rate on the transmission line. The output of the oscillator 110 is connected to the count (C) input of a binary counter 111 which produces one output pulse on the line 103 every time M pulses have been applied to its C input and one output pulse on the line 104 every time M/2 pulses have been applied to its C input. The signals present on the lines 103 and 104 will be designated RCP and 2RCP, respectively. The RCP and 2RCP signals are applied to the inputs of an AND gate 112 whose output is connected to the clock (CL) input of a D-type flip-flop 113, whose input is connected to the line 102 (FIG. 12) through an inverter 114 and whose reset (R) input is also connected to the line 102. The outputs of the inverter 114 and of the AND gate 112 are respectively connected to the D and CL inputs of a D-type flip-flop 115 whose true output produces a signal labeled SYNC FR which is sent over the line 105 (FIG. 12), The line 105 is connected to one input of an AND gate 116 which has its other input connected to the line 102 and produces a signal labeled LECT on the line 106 (FIG. 12).

The RCP signal is supplied through an inverter 117 to one input of an AND gate 118 which has its other input connected to the line 104 and its output connected to the CL input of a D-type flip-flop 119. The true output of the flip-flop 119 produces a signal labeled $\overline{\text{SYNC}}$ which is sent over the line 107 (FIG. 12). The complement output of the flip-flop 119 is connected to the D input of a D-type flip-flop 120 whose CL input is connected to the output of the AND gate 112 and whose true output produces a signal labeled SYNC CP whic is sent over the line 108 (FIG. 12). The true output of the flip-flop 120 is also connected to one input of an OR gate 121 whose other input is connected to the line 106 and whose output is connected to the D input of a D-type flip-flop 122. The flip-flop 122 has its CL input connected to the output of the AND gate 112 and has its true output connected to the line 109 (FIG. 12).

The operation of the device of FIG. 14 will now be described with reference to Table I and to FIGS. 15 and 16 which illustrate the waveforms obtained at various points of the device. The RCP signal defines the duration of a time slot, or bit time, and is low during the first half of the bit time and high during the second half. The centers of the first and second halves of the bit time are defined by the rising edges of the 2RCP signal. The (S1+S2) signal is obtained by OR'ing the S1 and S2 signals.

The RCP signal is synchronized by the frame-alignment bits and the stuffing bits. As mentioned earlier, the frame-alignment bits and the stuffing bits are characterized by the presence of a "1" bit in channel A and of a "0" bit in channel B.

Referring back to FIG. 4, it will be noted that the control bit in channel B is a "0" bit only when it is associated with a stuffing bit or with a frame-alignment bit. As shown in Table I, a "0" bit in channel B is encoded as a no-pulse condition during the second half of the bit time, the center of which is defined by a rising edge of the 2RCP signal occurring while the RCP signal is high. Such rising edges will be disignated T2 hereafter.

During operation in asynchronous mode (FIG. 15), the counter 111 provides the RCP and 2RCP signals, and the S1 and S2 signals, which are respectively representative of a high level and a low level of the incoming signal, take on various values such as those illustrated in FIG. 14. When no pulse is present in the incoming signal, the (S1+S2) signal is at a low level which is inverted by the inverter 14 and applied to the D inputs of the flip-flop 113 and 115. At the time T2, the output of the AND gate 112 goes high and the complement output of the flip-flop 113 goes low, thereby resetting the counter 111, and the SYNC FR signal at the output of the flip-flop 115 goes high. When the (S1+S2) signal goes high again, the flip-flop 113 is reset to zero, the R input of the counter 111 goes high and the counter 111 starts counting the pulses provided by the oscillator 110 and supplying the RCP and 2RCP signal pulses. At the next time T2, the SYNC FR signal goes low with a very short delay due to the time taken by the flip-flop 115 to toggle, and, since the (S1+S2) signal is high and the SYNC FR signal is still high, the flip-flop 122 produces the REV CL signal. The LECT signal takes the form shown in the figure and the SYNC CP signal is held at a low level. Note that, although the data are transmitted in asynchronous mode, the RCV CL signal supplied by the generator 92 produces pulses at a regular rate that could be used by the DCE L or any other device for synchronization purposes.

The operation in synchronous mode (FIG. 16) of the device of FIG. 14 will now be described. As has been seen, the synchronization bit is characterized by the presence of a "0" bit in each of the channels A and B. As Table I shows, "0" bits simultaneously present in channels A and B are encoded as a no-pulse condition during the entire bit time, and this is the only case in which the encoded signal exhibits no pulses during the first half of the bit time. Accordingly, the synchronization bit will be detected whenever a no-pulse condition is detected during the first half of the bit time. The center of this first half is defined by a rising edge of the 2RCP signal occurring while the RCP signal is low. Such rising edges will be designated T1 hereafter. As shown in FIG. 5, the synchronization bit may occur near a frame-alignment bit or be isolated within the frame. The upper part of FIG. 16 shows the waveforms obtained at various points of the generator 92 when the synchronization bit is isolated within the frame. The counter provides the RCP and 2RCP signals, and the S1 and S2 signals take on different values such as those shown. Where no pulse is present in the received signal, the (S1+S2) signal is low. At the first time T1, the complement output of the flip-flop 119 goes high. At the time T2, the RCP signal is high, the output of the AND gate 112 goes high, thereby resetting the counter 111, and the SYNC CP signal goes high. When the (S1+S2) signal goes high, a high level is supplied to the R input of the counter 111 which resumes counting the pulses generated by the oscillator 110. At the next time T1, the complement output of the flip-flop 119 goes low. At the next time T2, the SYNC CP signal is high and the flip-flop 122 produces a RCV CL signal pulse; also, the flip-flop 120 toggles and the SYNC CP signal goes low with a slight delay due to the time taken by the flip-flop to toggle. The SYNC FR and LECT signals are held at a low level.

The lower part of FIG. 16 shows the waveforms obtained at various points of the generator 92 when the synchronization bit follows a stuffing bit and a frame-alignment bit. The counter 111 is reset a first time, when the stuffing bit occurs, and a second time, when the frame-alignment bit occurs, and remains in that state as long as the synchronization bit is present. The waveforms produced by the generator 92 are shown in the figure. The RCV CL signal pulses are supplied as Transmitter Timing pulses to the DCE L via line 109.

Figure 17:
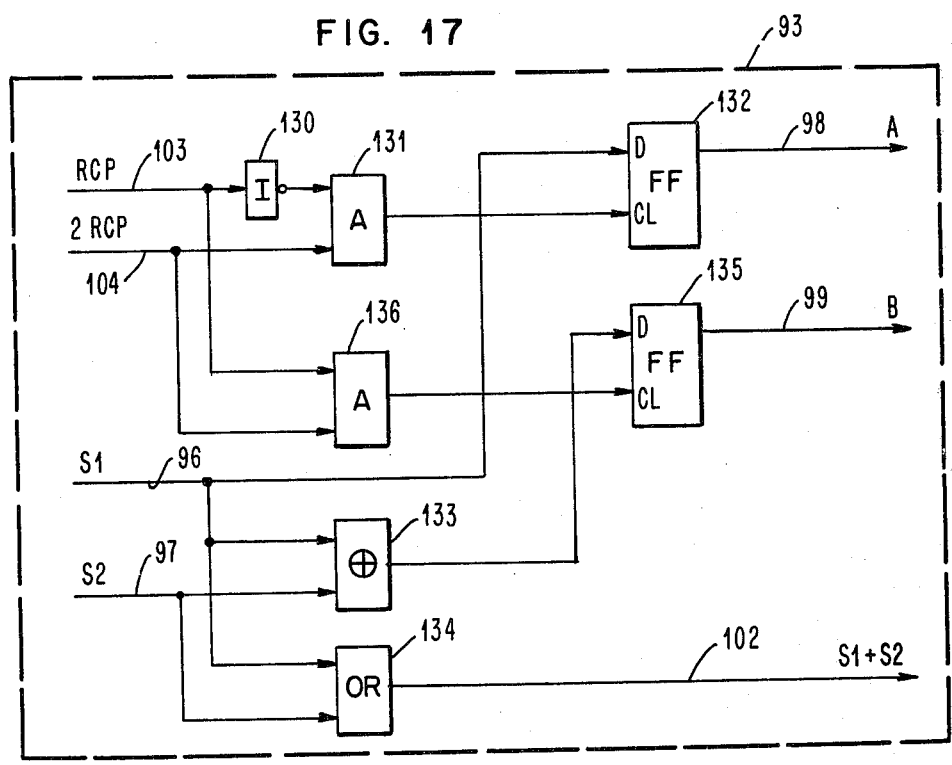
FIG. 17 is an exemplary embodiment of the decoder 93 of FIG. 12.

Referring now to FIG. 17, an exemplary embodiment of the decoder 93 of FIG. 12 is shown. The line 103 from the generator 92 is connected through an inverter 130 to one input of an AND gate 131 whose other input is connected to the line 104. The output of the AND gate 131 is connected to the CL input of a D-type flip-flop 132, which has its D input connected to the line 96 and its output connected to the channel A output line 98. The output lines 96 and 97 of the analog receiver 91 are connected to the inputs of an Exclusive OR circuit 133 and of an OR gate 134. The output of the Exclusive OR circuit 133 is connected to the D input of a D-type flip-flop 135 which has its CL input connected to the output of an AND gate 136 and its output connected to the channel B output line 99. The inputs of the AND gate 136 are respectively connected to the lines 103 and 104. The OR gate 134 produces the (S1+S2) signal on the line 102.

The operation of the decoder of FIG. 117 will now be briefly described with reference to Table I. Table I shows that the channel A bit is a "1" bit only when the encoded signal represents a positive pulse, that is, when the S1 signal has a logical "1" value, during the first half of the bit time. Similarly, the channel B bit is a "1" bit only when the encoded signal represents a positive or a negative pulse, that is, when either of the S1 and S2 signals has a logical "1" value, during the second half of the bit time. In the device of FIG. 17, the center of the first half of the bit time, or time T1, is defined by a rising edge of the output of the AND gate 131. The true output of the flip-flop 132 takes on the value of the S1 signal at that rising edge, and thus produces the channel A bit. The center of the second half of the bit time, or time T2, is defined by a rising edge of the output of the AND gate 136. The true output of the flip-flop 135 takes on the value of the output of the Exclusive OR circuit 133 at the latter rising edge and thus produces the channel B bit. Note that the channel B bits are control bits that can be used for testing purposes.

Figure 18:
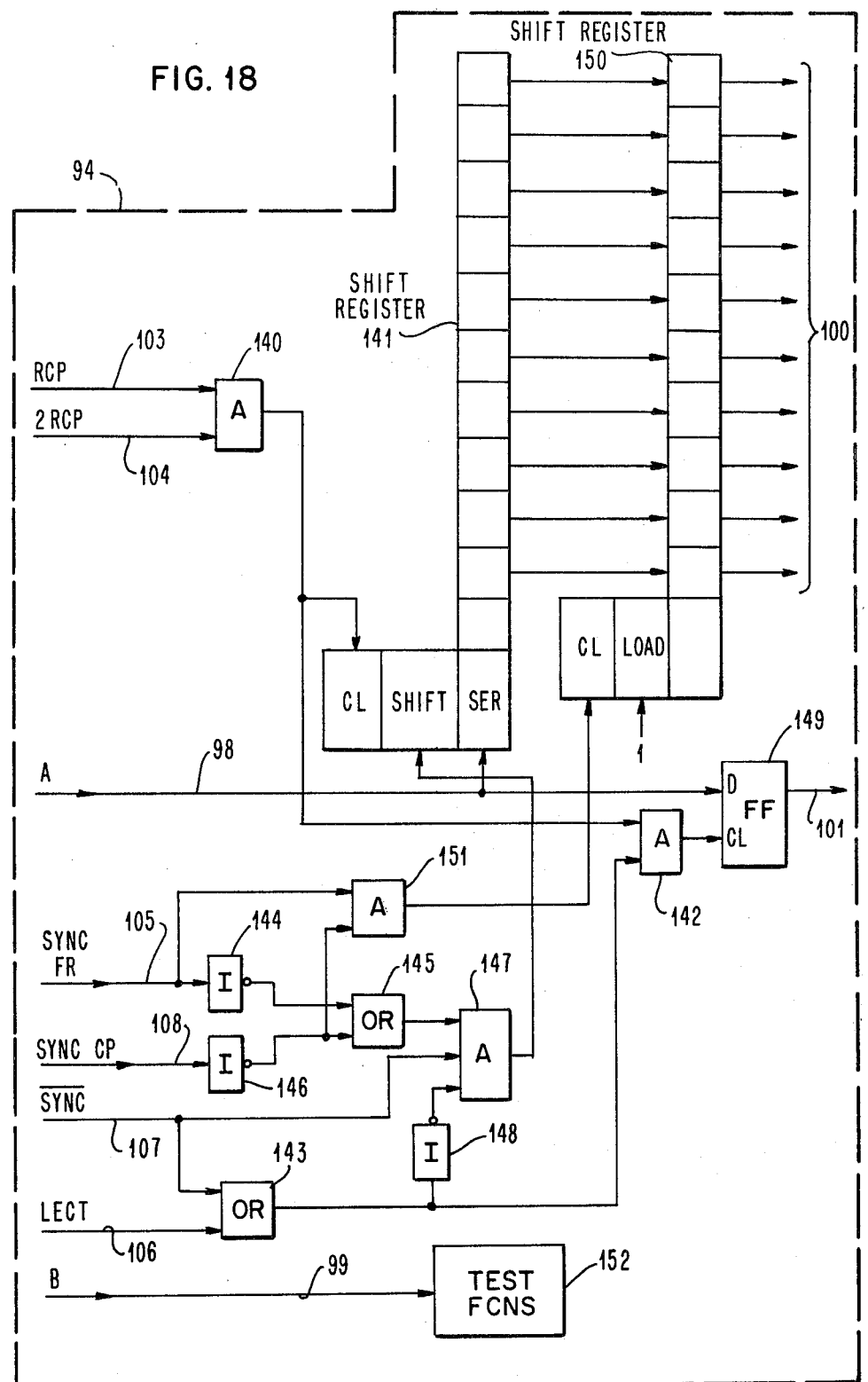
FIG. 18 shows an exemplary embodiment of the demultiplexer 94 of FIG. 12.

Referring now to FIG. 18, an exemplary embodiment of the demultiplexer 94 of FIG. 12 is shown. The lines 103 and 104 from the generator 92 are connected to the inputs of an AND gate 140 whose output is connected to the Clock (CL) input of an eleven-stage shift register 141 similar to the shift register 40 of FIG. 9. The output of the AND gate 140 is also connected to one input of an AND gate 142 which has its other input connected to the output of an OR gate 143, whose two inputs are respectively connected to the lines 106 and 108. The line 105 is connected through an inverter 144 to one input of an OR gate 145 which has its other input connected to the line 108 through an inverter 146. The output of the OR gate 145 is connected to one input of an AND gate 147, which has another input connected to the output of the OR gate 143 through an inverter 148, and another input connected to the line 107. The output of the AND gate 147 is connected to the Shift input of the register 141. The output of the AND gate 142 is connected to the clock (CL) input of a D-type flip-flop 149 which has its D input connected to the line 98 and its true output connected to the data output line 101. The line 98 is further connected to the Serial (SER) input of the shift register 141. The outputs of all stages of the register 141 (except the lowermost one) are respectively connected to the inputs of the ten stages of a register 150. In the illustrated example, the register 150 is a shift register similar to the shift register 141 except that no shifting of its contents takes place. The register 150 has its Clock (CL) input connected to the output of an AND gate 151 whose inputs are respectively connected to the line 105 and to the output of the inverter 146; the Load input of the register 150 is held at a high level, and the outputs of its ten stages are connected to the control signal output lines 100 (FIG. 12). The channel B output line 99 is connected to a box 152 which symbolizes various test functions for whose purposes the channel B control bits may be used.

Figure 15:
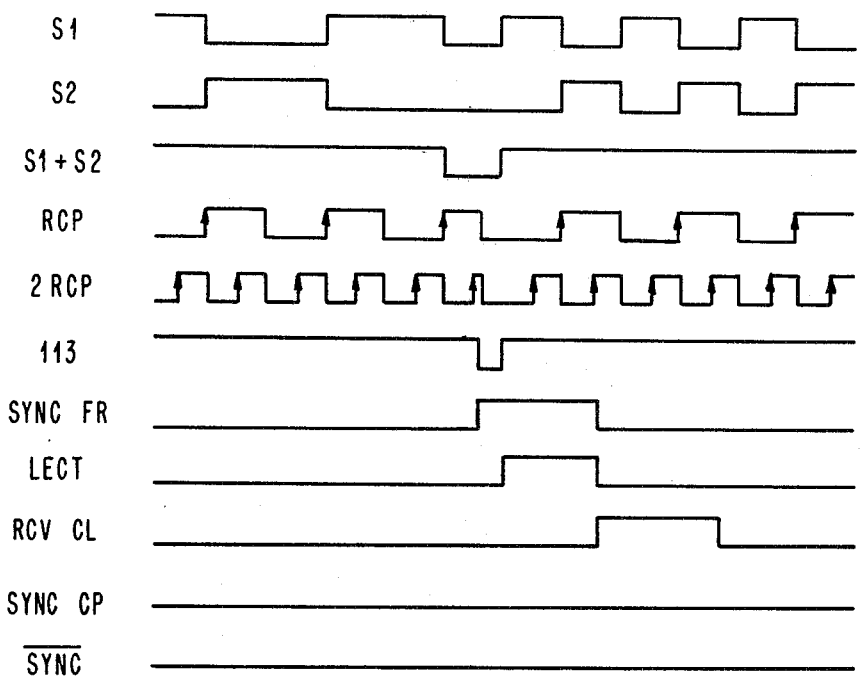

The operation in asynchronous mode of the device of FIG. 18 will now be descibed with reference to FIGS. 4 and 15. Before the first frame is received, the averrage amplitude of the signal received from the transmission line is equal to zero, the (S1+S2) signal is low and the registers 141 and 150 contain "0" bits. When the first frame-alignment bit, indicating the beginning of the first frame, is received, the (S1+S2) signal goes high, and at the first time T2 the SYNC FR signal goes high, causing a low level to be applied to the Shift input of the register 141. As soon as the data bit D1 is received, the LECT signal goes high, and at the next time T2, which is defined by a rising edge of the output of the AND gate 140, the data bit D1 on the line 98 is transferred over the data output line 101. Shortly after T2, the SYNC FR and SYNC CP signals go low. The low level of the SYNC FR signal causes a high level to be applied to the Shift input of the register 141. The samples of the signals X1–X10 successively available on the line 98 are then loaded into the register 131 and shifted upward whenever the time T2 occurs. When the next frame-alignment bit is received on the line 98, the content of the register 141 is shifted upward and the frame-alignment bit is loaded into its lowermost stage at a rising edge of the output signal of the AND gate 140. Shortly therafter, the SYNC FR signal goes high, causing the samples of the signals X1–X10 stored in the upper ten stages of the register 141 to be loaded into the ten stages of the register 150 for transmission over the lines 100. The next data bit and the next samples of the signals X1–X10 are similarly processed.

The operation in synchronous mode of the device of FIG. 18 will now be described with reference to FIGS. 5, 16 and 18, using by way of example a bit rate of 14.4 kbps. Initially, the registers 141 and 150 only contain "0" bits, the (S1+S2) signal is low and the SYNC CP and SYNC FR signals are both high.

When the first synchronization bit indicating the beginning of the first frame appears on the line 98, nothing happens since the (S1+S2) signal resulting from the occurrence of the synchronization bits is low. When the data bit D1 appears on line 98, the (S1+S2) signal goes high and at the first rising edge of the output signal of the AND gate 140 the bit D1 is transferred over the line 101, the SYNC CP, SYNC FR and LECT signals go low and the RCV CL signal goes high. A high level is then applied to the Shift input of the register 141. The samples of the signals X1–X6 are then successively loaded into the register 141 as in the asynchronou mode described earlier.

When the synchronization bit which follows the sample of the control signal X6 appears on the line 98, the (S1+S2) signal goes low. At the next time T1, the $\overline{\text{SYNC}}$ signal on the line 107 goes low and a low level is applied to the Shift input of the register 141, thereby preventing the synchronization bit from being loaded into the register 141. At the next time T2, the SYNC FR and SYNC CP signals go high, thereby preventing the content of the register 141 from being loaded into the register 150. When the data bit D2 appears on the line 98, it will be transferred over the output line 101 at the next time T2. The samples of the control signals X7–X10 are then successively loaded into the register 141. When the first stuffing bit appears on the line 98 (lower part of FIG. 16), it will be loaded into the register 141 at the first time T2 that follows its appearance on the line 98. Shortly after the time T2, the SYNC FR signal goes high and the samples of the control signals X1–X10 that are available in the upper ten stages of the register 141 are transferred to the register 150. When the data bit D3 appears on the line 98, the (S1+S2) and LECT signals go high and at the next time T2 the data bit D3 will be transferred over the output line 101. The second frame is processed in a manner similar to that described above.

While the interface transmitter and receiver of the present invention have been described above as interconnecting a DTE and a DCE, those skilled in the art will understand that they could be used for interconnecting any types of data equipment and more particularly a DTE and another DTE.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. A time-division multiplexing method for combining a data signal transmitted at a bit rate DR which may take on a given number of different values and N secondary signals into one train of pulses for transmission at a fixed bit rate LR over a transmission path, characterized in that it includes the steps of:
  multiplexing the data signal together with the N secondary signals by means of a recurrent frame called an asynchronous frame which includes a frame-alignment bit having a predetermined value, a data bit, and N bits pertaining respectively to the N secondary signals, whenever the data signal is to be transmitted in asynchronous mode,
  multiplexing the data signal together with the N secondary signals by means of a recurrent frame called a synchronous frame whenever the data signal is to be transmitted in synchronous mode, said synchronous frame being divided up into n subframes $l_1$ bits in length, where n is an interger equal to or immediately larger than the quantity $N/(l_1-2)$ with $l_1 = LR/DR$, and each subframe including a synchronization bit whose value is complementary to that of the frame-alignment bit, a data bit, and bits pertaining to the secondary signals, with the last subframe in the frame additionally including a frame-alignment bit, generating control bits each of which is associated with one bit in said frames, said control bits having a first predetermined value when they are associated with a frame-alignment bit or with a synchronization bit, and the complementary value to said first predetermined value when they are associated with the data bits or with the bits pertaining to the secondary signals, and encoding each of the bits in the frame and the control bit associated therewith for simultaneous transmission over the transmission path.

2. A method according to claim 1, characterized in that said fixed bit rate LR is equal to the least common multiple of even value of the bit rates at which the data signal can be transmitted.

3. A method according to claim 1, characterized in that the frame-alignment bit is preceded by at least one stuffing bit which has the same value as the frame-alignment bit, with the control bit associated with the stuffing bit having the same value as the control bit associated with the frame-alignment bit.

4. A method according to claim 1 or claim 2 or claim 3, characterized in that each of the frame bits and its control bit, both of which make up a pair, are encoded as follows:

if the control bit has a first logic value, the pair of bits is encoded as a signal of a first type which may be bipolar or two-phased, and if the control bit has a value complementary to that of said first logic value, the pair of bits is encoded as a signal of a second type which may be bipolar or two-phased but different from said first type.

5. A method according to claim 1, characterized in that each of the frame bits and its control bit, both of which make up a pair, are encoded as follows:

if the control bit has a first logic value, the pair of bits is encoded as a signal of a first type which may be bipolar or two-phased, and if the control bit has a value complementary to that of said first logic value, the pair of bits is encoded as a signal of a second type which may be bipolar or two-phased but different from said first type, and including the steps of:

extracting from the multiplexed signal the frame bits and the associated control bits, detecting the frame-alignment bits, the synchronization bits and the stuffing bits among the frame bits by using the value of the associated control bits, and extracting from the frame bits the data bits and the bits pertaining to the N secondary signals.

6. A method according to claim 3, characterized in that the frame bits and the associated control bits are extracted from the multiplexed signal as follows:

if the multiplexed signal is of the first type, the control bit has a first logic value and the value of frame bit associated therewith is dependent upon the multiplexed signal, if the multiplexed signal is of said second type, the logic value of the control bit is complementary to said first logic value, and the value of the frame bit associated therewith is dependent upon the multiplexed signal.

7. A demultiplexing method for demultiplexing a train of pulses resulting from a multiplexing process in accordance with claim 1 or claim 2 or claim 3, characterized in that it includes the steps of:

extracting from the multiplexed signal the frame bits and the associated control bits, detecting the frame-alignment bits, the synchronization bits and the stuffing bits among the frame bits by using the value of the associated control bits, and extracting from the frame bits the data bits and the bits pertaining to the N secondary signals.

8. A time-division multiplexing apparatus for combining a data signal transmitted at a bit rate DR which may take on a given number of different values and N secondary signals into one train of pulses for transmission at a fixed bit rate LR over a transmission path, characterized in that it includes:

means for receiving said data signal, means for receiving said secondary signals, means for receiving timing signals, means for multiplexing the data signal together with the N secondary signals by means of a recurrent frame called an asynchronous frame which includes a frame-alignment bit having a predetermined value, a data bit, and N bits pertaining respectively to the N secondary signals, whenever none of said timing signals is received, and for multiplexing the data signal together with the N secondary signals by means of a recurrent frame called a synchronous frame whenever said timing signals are received, said synchronous frame being divided up into n subframes $l_1$ bits in length, where n is an integer equal to or immediately larger than the quantity $N/(l_1-2)$ with $l_1=LR/DR$, and each subframe including a synchronization bit whose value is complementary to that of the frame-alignment bit, a data bit, and bits pertaining to the secondary signals, with the last subframe in the frame additionally including a frame-alignment bit, means for generating control bits each of which is associated with one bit in said frames, said control bits having a first predetermined value when they are associated with a frame-alignment bit or with a synchronization bit, and the complementary value to said first predetermined value when they are associated with the data bits or with the bits pertaining to the secondary signals, means for encoding each of the frame bits and the control bit associated therewith for simultaneous transmission over the transmission path, and means for applying the encoded signal to said transmission path.

9. Apparatus according to claim 8, characterized in that said fixed bit rate LR is equal to the least common multiple of even value of the bit rates at which the data signal can be transmitted.

10. Apparatus according to claim 8, characterized in that the frame-alignment bit is preceded by at least one stuffing bit which has the same value as the frame-alignment bit, with the control bit associated with the stuffing bit having the same value as the control bit associated with the frame-alignment bit.

11. Apparatus according to claim 8 or claim 9 or claim 10, characterized in that said means for encoding the frame bits and the control bits, with every frame bit and the control bit associated therewith making up a pair of bits, includes:

means for encoding each pair of bits as a signal of a first type which may be bipolar or two-phased, whenever the control bit has a first logic value, and means for encoding each pair of bits as a signal of a second type which may be bipolar or two-phased but is different from said first type, whenever the value of the control bit is complementary to said first logic value.

12. An interface transmitter for combining a data signal transmitted at a bit rate DR which may take on a given number of different values and N secondary signals supplied by a first data equipment, into one train of pulses for transmission at a fixed bit rate LR to a second data equipment over a transmission path, characterized in that it includes:

means for receiving said data signal,
means for receiving said secondary signals,
means for receiving the timing signals supplied by said first data equipment,
means for multiplexing the data signal together with the N secondary signals by means of a recurrent frame called an asynchronous frame which includes a frame-alignment bit having a predetermined value, a data bit, and N bits pertaining respectively to the N secondary signals, whenever none of said timing signals is received, and for multiplexing the data signal together with the N secondary signals by means of a recurrent frame called a synchronous frame whenever said timing signals are received, said synchronous frame being divided up into n subframes $l_1$ bits in length, where n is an integer equal to or immediately larger than the quantity $N/(l_1-2)$ with $l_1=LR/DR$, and each subframe including a synchronization bit whose value is complementary to that of the frame-alignment bit, a data bit, and bits pertaining to the secondary signals, with the last subframe in the frame additionally including a frame-alignment bit,
means for generating control bits each of which is associated with one bit in said frames, said control bits having a first predetermined value when they are associated with a frame-alignment bit or with a synchronization bit, and the complementary value to said first predetermined value when they are associated with the data bits or with the bits pertaining to the secondary signals,
means for encoding each of the bits in the frame and the control bit associated therewith for simultaneous transmission over the transmission path, and
means for applying the encoded signal to said transmission path.

13. An interface transmitter according to claim 12, characterized in that said fixed bit rate LR is equal to the least common multiple of even value of the bit rates at which the data signal can be transmitted.

14. An interface transmitter according to claim 12, characterized in that the frame-alignment bit is preceded by at least one stuffing bit which has the same value as the frame-alignment bit, with the control bit associated with the stuffing bit having the same value as the control bit associated with the frame-alignment bit.

15. An interface transmitter according to claim 12 or claim 13 or claim 14, characterized in that said means for encoding the frame bits and the control bits, with every frame bit and the control bit associated therewith making up a pair of bits, includes:

means for encoding each pair of bits as a signal of a first type which may be bipolar or two-phased, whenever the control bit has a first logic value, and
means for encoding each pair of bits as a signal of a second type which may be bipolar or two-phased but is different from said first type, whenever the value of the control bit is complementary to said first logic value.

* * * * *